(12) United States Patent
Hui et al.

(10) Patent No.: US 12,113,390 B2
(45) Date of Patent: Oct. 8, 2024

(54) BATTERY CHARGING SYSTEM AND METHOD USING DYNAMICALLY ADJUSTED BATTERY VOLTAGE THRESHOLD FOR SWITCHING CHARGING MODES

(71) Applicant: The University of Hong Kong, Hong Kong (CN)

(72) Inventors: Shu Yuen Ron Hui, Hong Kong (CN); Yun Yang, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 527 days.

(21) Appl. No.: 17/607,357

(22) PCT Filed: May 19, 2020

(86) PCT No.: PCT/CN2020/090939
§ 371 (c)(1),
(2) Date: Oct. 28, 2021

(87) PCT Pub. No.: WO2020/233552
PCT Pub. Date: Nov. 26, 2020

(65) Prior Publication Data
US 2022/0224140 A1 Jul. 14, 2022

Related U.S. Application Data

(60) Provisional application No. 62/852,143, filed on May 23, 2019.

(51) Int. Cl.
*H02J 7/00* (2006.01)
*H02J 50/12* (2016.01)
*H02M 3/335* (2006.01)

(52) U.S. Cl.
CPC ...... *H02J 7/007182* (2020.01); *H02J 7/0048* (2020.01); *H02J 7/005* (2020.01);
(Continued)

(58) Field of Classification Search
CPC .... H02J 7/007182; H02J 7/0048; H02J 7/005; H02J 2207/20; H02J 50/12; H02M 3/33573
(Continued)

(56) References Cited

U.S. PATENT DOCUMENTS

| | | | |
|---|---|---|---|
| 2016/0072313 A1* | 3/2016 | Satou | H01M 10/44 320/162 |
| 2016/0181824 A1 | 6/2016 | Hui et al. | |
| 2018/0086215 A1* | 3/2018 | Yoo | B60L 58/16 |

FOREIGN PATENT DOCUMENTS

| | | |
|---|---|---|
| CN | 207124490 U | 3/2018 |
| EP | 3444917 A1 | 2/2019 |
| WO | 2012043744 A1 | 4/2012 |

OTHER PUBLICATIONS

PCT/CN2020/090939. International Search Report (Aug. 18, 2020).
PCT/CN2020/090939. International Preliminary Report on Patentability (Sep. 26, 2021).

* cited by examiner

*Primary Examiner* — Nathaniel R Pelton
(74) *Attorney, Agent, or Firm* — LOZA & LOZA LLP; Derek Yeung

(57) ABSTRACT

A battery charging system determines a current condition of a battery in real time and dynamically determine a threshold voltage for controlling a charging mode of the battery based on the current battery condition. The battery charging system charges the battery using a constant current (CC) mode or constant voltage (CV) mode based on the battery voltage and the dynamically determined threshold voltage. The (Continued)

battery charging system can determine the voltage and current of the battery in real time without receiving information on the battery from the power receiving side of the battery charging system.

27 Claims, 21 Drawing Sheets

(52) U.S. Cl.
CPC ......... *H02J 50/12* (2016.02); *H02M 3/33573* (2021.05); *H02J 2207/20* (2020.01)

(58) Field of Classification Search
USPC ........................................................ 320/108
See application file for complete search history.

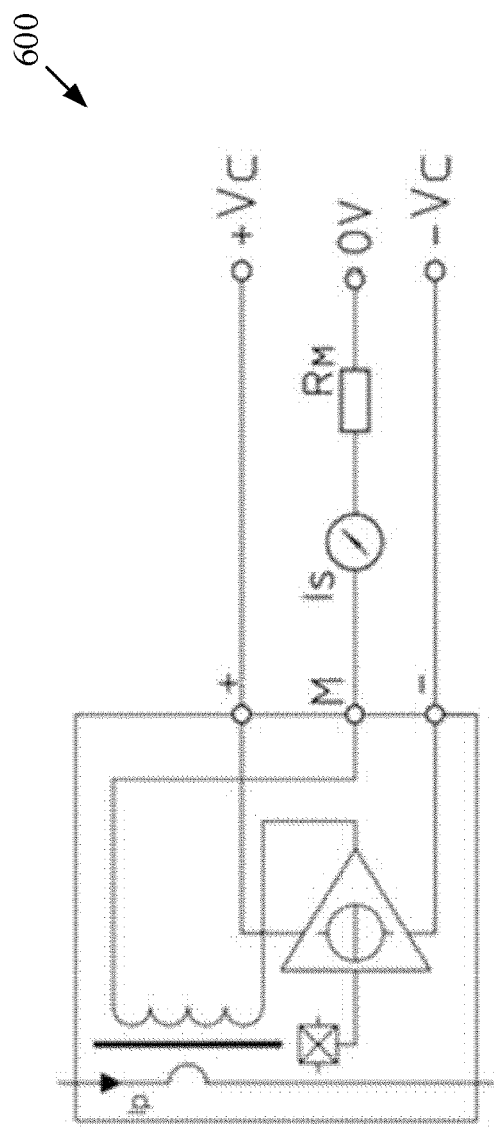
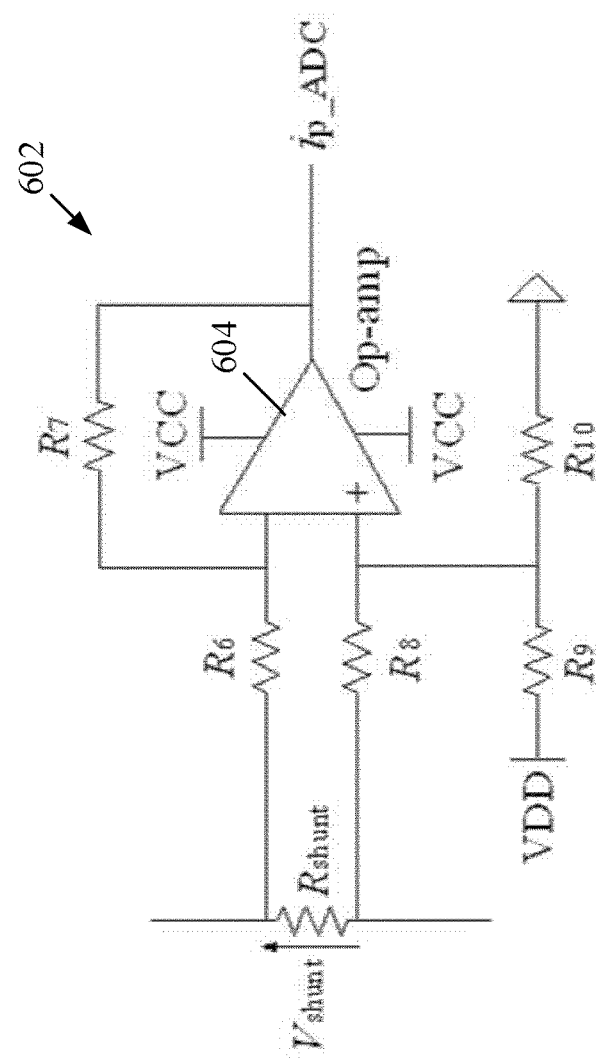
FIG. 16

BATTERY CHARGING SYSTEM AND METHOD USING DYNAMICALLY ADJUSTED BATTERY VOLTAGE THRESHOLD FOR SWITCHING CHARGING MODES

PRIORITY CLAIM

This application claims priority to and the benefit of U.S. provisional patent application No. 62/852,143 filed in the United States Patent and Trademark Office on May 23, 2019, the entire content of which is incorporated herein by reference as if fully set forth below in its entirety and for all applicable purposes.

TECHNICAL FIELD

The technology discussed below generally relates to rechargeable batteries and specifically relates to a charging system and method for charging a battery based on a dynamically adjusted battery threshold voltage for controlling charging modes.

INTRODUCTION

FIG. 1 is a drawing illustrating an exemplary 2-stage battery charging process. The two stages are constant-current (CC) mode and constant-voltage (CV) mode. In the CC mode, the system charges a battery with a constant current. In the CV mode, the system charges the battery with a constant voltage. The state-of-charge (SoC), which may be defined as the percentage of the full capacity of a battery, may be used to control the charging process. The state-of-health (SoH) refers to the condition of a battery as compared to its new condition. Typically, a battery's SoH is 100% at the time of manufacture and gradually decreases over time and usage. A charging system may have a battery management circuit that monitors the battery condition (e.g., voltage and current) during charging. The choice of a charging mode may depend on the battery voltage corresponding to a certain SoC. In one example, when the battery voltage is below a certain pre-set or battery reference value ($V_{batref}$), the charging system operates in the CC mode and provides a constant charging current 102 to the battery. When the battery is charged under a constant current in the CC mode, the battery voltage increases. When the battery voltage ($V_{bat}$) reaches or exceeds the pre-set or reference value (e.g., $V_{bat} \geq V_{batref}$), the charging system switches to the CV mode and provides a constant charging voltage 104 to the battery. However, using a constant or fixed pre-set voltage $V_{batref}$ for selecting the charging mode (CC mode or CV mode) may not result in optimal charging of the battery for the purpose of prolonging the battery life and/or charging efficiency.

SUMMARY OF INVENTION

In general, the present disclosure provides a method and a system for charging a battery using a battery voltage threshold that is dynamically determined or updated based on the changing maximum state-of-charge (SoC) and/or state-of-health (SoH) of the battery.

One aspect of the present disclosure provides a battery charging system for charging a battery. The battery charging system includes a charging circuit configured to charge the battery and a controller communicatively coupled with the charging circuit. The controller is configured to determine a current condition of the battery and dynamically determine a threshold voltage for controlling a charging mode of the charging circuit, based on the current condition. The controller is further configured to determine a battery voltage of the battery during charging, configure the charging circuit to charge the battery using a constant current (CC) mode when the battery voltage is less than the threshold voltage, and configure the charging circuit to charge the battery using a constant voltage (CV) mode when the battery voltage is equal to or greater than the threshold voltage.

Another aspect of the present disclosure provides a battery charging method. The method determines a current condition of a battery and dynamically determines a threshold voltage for controlling a charging mode of the battery based on the current condition. The method further determines a battery voltage of the battery during charging, charges the battery using a constant current (CC) mode when the battery voltage is less than the threshold voltage, and charges the battery using a constant voltage (CV) mode when the battery voltage is equal to or greater than the threshold voltage.

BRIEF DESCRIPTION OF THE DRAWINGS

FIG. 16 is a diagram illustrating exemplary current sensors according to some aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts. While aspects and embodiments are described in this application by illustration to some examples, those skilled in the art will understand that additional implementations and use cases may come about in many different arrangements and scenarios.

Aspects of the present disclosure provide a method and a system for charging a battery using a battery voltage threshold that is dynamically determined or updated based on the changing maximum state-of-charge (SoC) and/or state-of-health (SoH) of the battery. In some aspects of the disclosure, SoC and SoH may be defined by equations (1) and (2) below.

$$SoC = \frac{Q_{releasable}}{Q_{rated}} \quad (1)$$

$$SoH = \frac{Q_{max}}{Q_{rated}} \quad (2)$$

$Q_{releasable}$: releasable charge capacity of the battery load
$Q_{rated}$: rated charge capacity of the battery load
$Q_{max}$: the maximum charge capacity of the battery that deteriorates with time.

An exemplary battery charging process selects a constant-current (CC) mode or constant-voltage (CV) mode during different stages of the battery charging process based on a battery voltage threshold that is dynamically determined in relation to changing maximum SoC or SoH of the battery. In some aspects of the disclosure, the charging process may be used in wired charging systems and wireless charging systems. Some aspects of the disclosure provide a wireless charging system that is configured to control a charging process based solely on the primary voltage and current of a transmitter circuit of the charging system. In some aspects of the disclosure, a wireless battery charging system may be implemented without a wireless communication system for feedback control purposes, and without an extra battery management circuit at the receiver side between the battery load and rectifier output.

Figure 1:
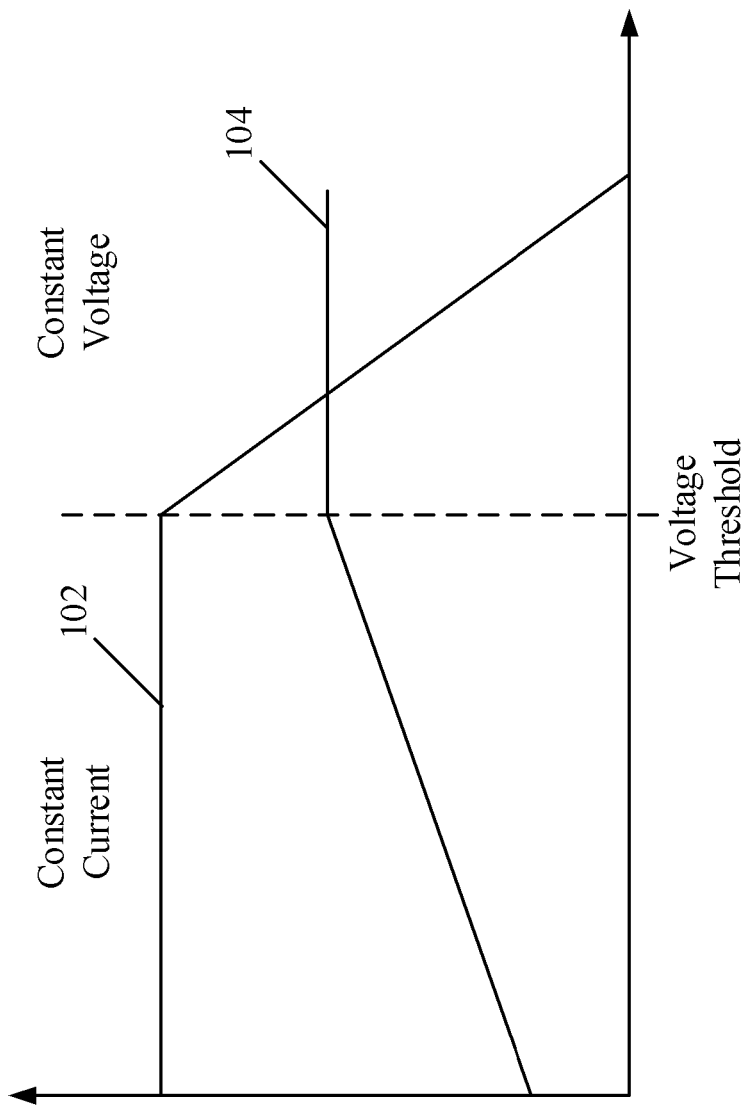
FIG. 1 is a drawing illustrating an exemplary 2-stage battery charging process.
Figure 2:
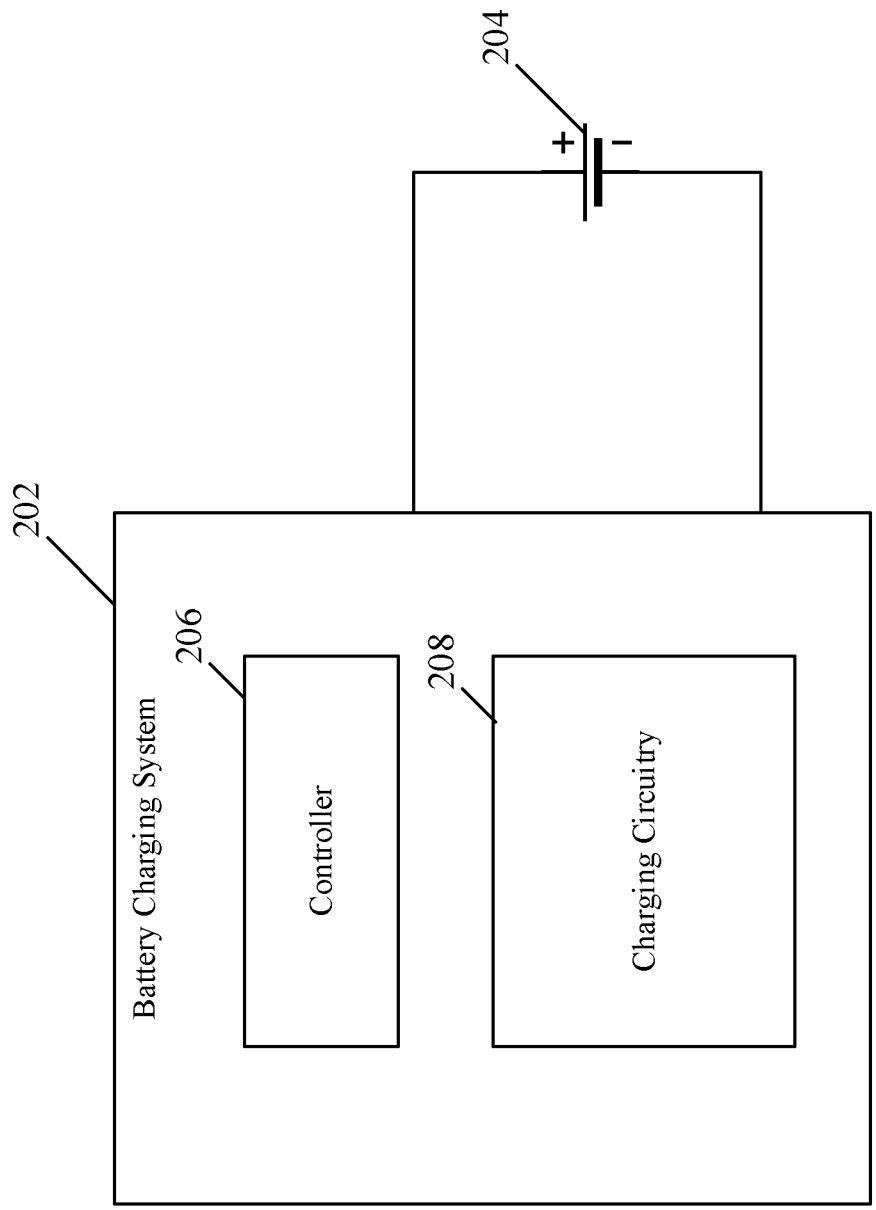
FIG. 2 is a diagram illustrating an exemplary battery charging system according to some aspects of the present disclosure.

FIG. 2 is a diagram illustrating an exemplary battery charging system 202 configured to charge a battery load 204. The battery charging system 202 may include a controller 206 and charging circuitry 208 configured to charge the battery 204 using two or more charging modes, for example, a constant-current (CC) mode and a constant-voltage (CV) mode. The controller 206 performs various functions for controlling and monitoring the charging process. The controller 206 and charging circuitry 208 may be implemented in various combinations of hardware and software configurations. The controller 206 selects the charging mode (CC or CV mode) depending on the battery voltage. For example, the charging circuitry 208 and/or controller 206 may be configured to monitor the battery voltage in real time or frequently to closely monitor the battery voltage during charging. When the battery voltage ($V_{bat}$) is below a pre-set reference value ($V_{batref}$) or voltage threshold, the charging circuitry provides a constant current (CC mode) to charge the battery. When the battery voltage reaches or exceeds the voltage threshold ($V_{bat} \geq V_{batref}$), the charging circuitry provides a constant voltage (CV mode) to charge the battery.

Figure 3:
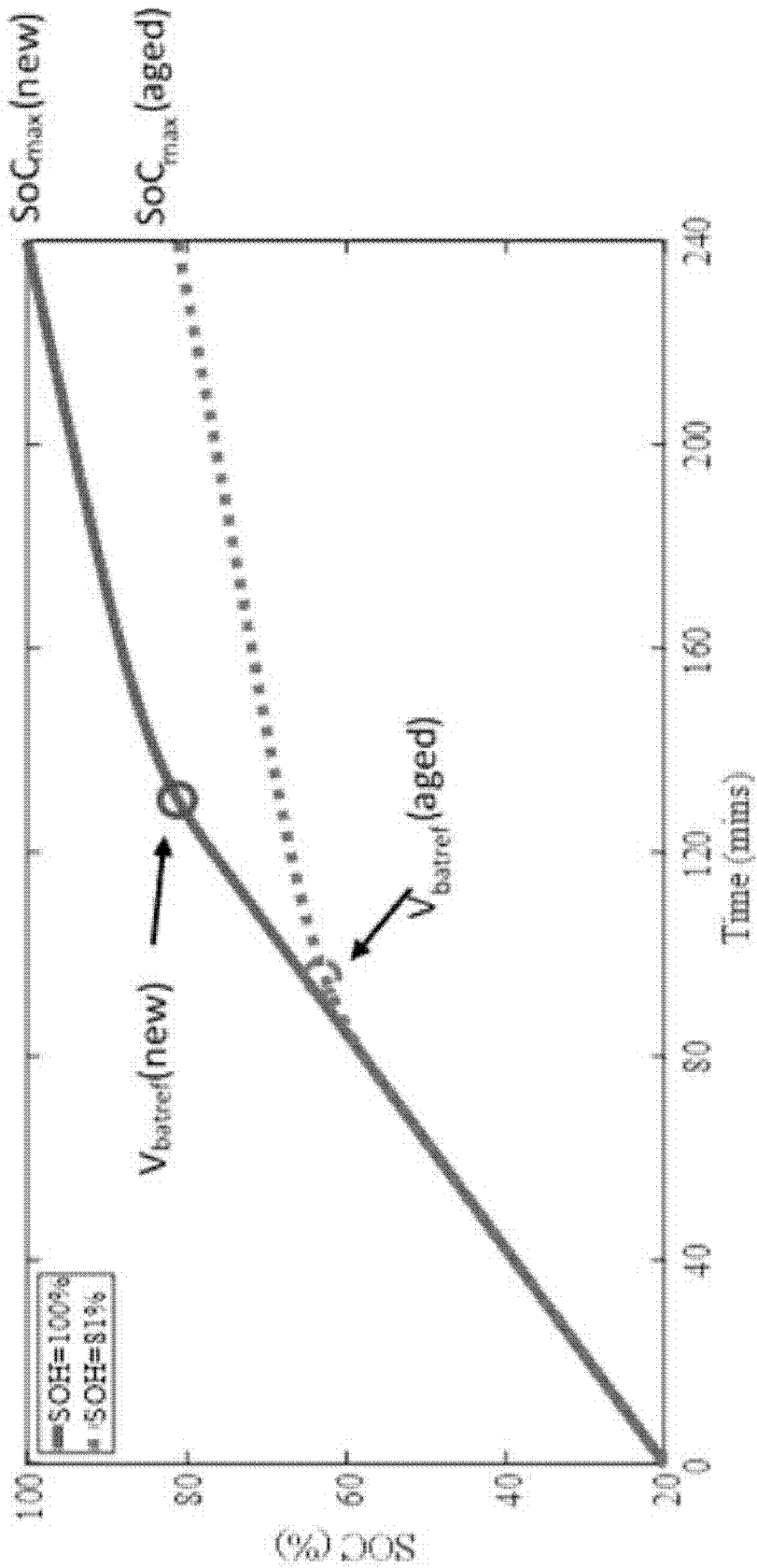
FIG. 3 is a drawing illustrating variations of state-of-charge (SoC) characteristics of an exemplary battery.

In some examples, the threshold voltage ($V_{batref}$) may be fixed to a constant value. However, using a constant or fixed threshold voltage for controlling the charging mode (CC or CV) generally does not result in optimal charging of the battery for the purpose of prolonging the battery life. It is because the relationship between the battery voltage and the SoC and SoH of the battery will change with time. In practice, the actual relationship between $V_{batref}$ and SoC of a battery changes with time, usage, and aging of the battery. FIG. 3 illustrates changes of the maximum SoC with time for an exemplary battery in new and aged conditions. In general, the maximum SoC ($SoC_{max}$) decreases with battery aging. The suitable (e.g., optimal) voltage threshold ($V_{batref}$) for switching the charging mode from CC mode to CV mode also changes with time. Therefore, in some aspects of the disclosure, the charging process updates the $V_{batref}$ to SoC relationship frequently (e.g., in real time) in order to determine the correct, optimal, or suitable $V_{batref}$ for switching between CC mode and CV mode during charging.

Aspects of the present disclosure relate to an improved charging method and system that utilizes a dynamically updated battery voltage threshold ($V_{batref}$) in relation to the up-to-date maximum SoC capacity ($SoC_{max}$) and SoH of the battery for selecting the CC mode and CV mode during different stages of charging. Both $SoC_{max}$ and SoH may vary during the operating lifetime and usage of the battery. Unlike known practice of treating the voltage threshold as a constant or fixed value, such $V_{batref}$ value can vary with the changes of the $SoC_{max}$ and SoH over the operating time of the battery and during charging. In some aspects of the disclosure, a procedure for dynamically setting the $V_{batref}$ value based on the changing $SoC_{max}$ and SoH is disclosed. This procedure for updating $V_{batref}$ can be applied to both wired (e.g., plug-in) chargers and wireless chargers.

As illustrated in FIG. 3, a battery in new and aged conditions may have different optimal battery threshold ($V_{batref}$) values for switching between CC mode and CV mode during charging. Aspects of the present disclosure provide a procedure for determining the $V_{batref}$ value during battery charging so that the changing mode can be changed from the CC mode to the CV mode in consideration of changing $SoC_{max}$ and SoH of the battery.

Figure 4:
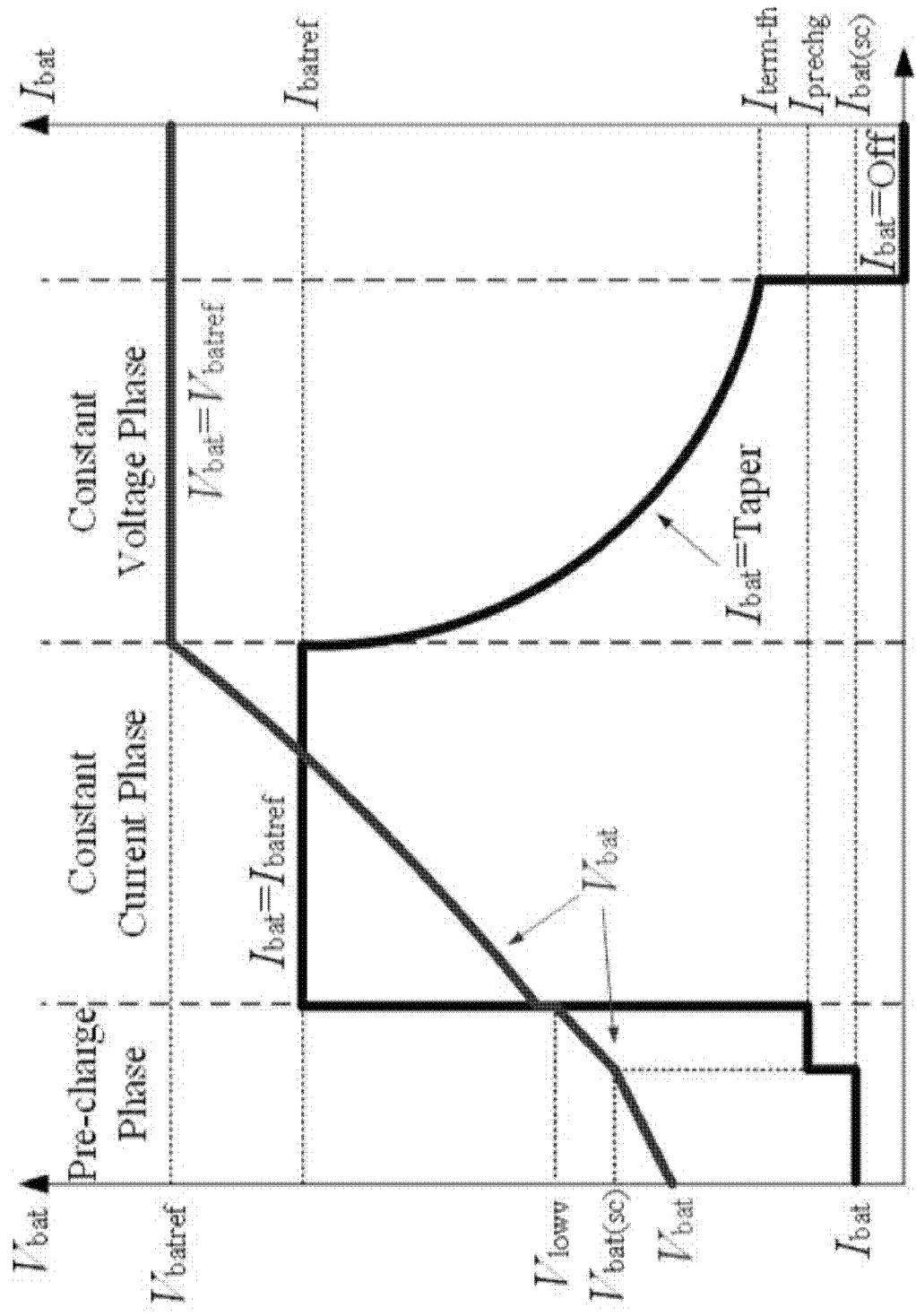
FIG. 4 is a drawing illustrating an exemplary charging profile according to some aspects of the present disclosure.
Figure 5:
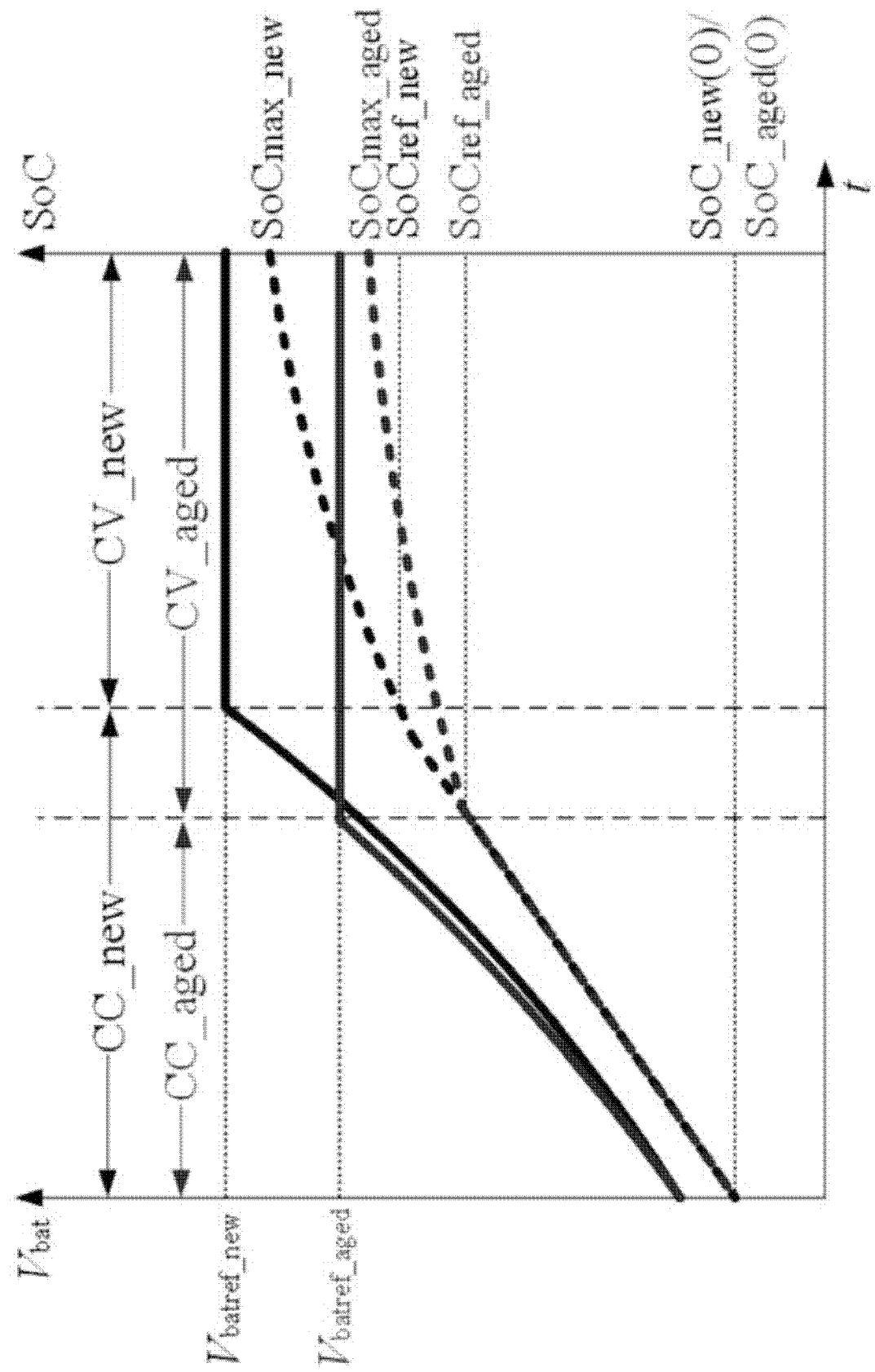
FIG. 5 is a drawing illustrating variations of a threshold voltage with respect to changes in state-of-health (SoH) of an exemplary battery according to some aspects of the present disclosure.

FIG. 4 is a drawing illustrating an exemplary charging profile. FIG. 5 is a drawing illustrating that $V_{batref}$ gradually changes with SoC/SoH as the battery ages. Referring to FIG.

4, in an initial charging stage (denoted as a pre-charge phase in FIG. 4), the battery voltage ($V_{bat}$) is compared with a predetermined low value ($V_{bat(sc)}$) that signifies an almost "short circuit" situation of the battery. If $V_{bat}$ is less than $V_{bat(sc)}$ ($V_{bat} < V_{bat(sc)}$), a battery charger charges the battery under the CC mode using a small constant current $I_{bat(sc)}$. When $V_{bat}$ is equal to or greater than $V_{bat(sc)}$ ($V_{bat} \geq V_{bat(sc)}$), the charger increases the magnitude of the constant current to a precharge level of $I_{prechg}$. When $V_{bat}$ exceeds the level of $V_{lowv}$, the charger further increases the magnitude of the constant current to the level of $I_{batref}$, which may be referred to as the bulk current in a constant current phase. When $V_{bat}$ is equal to or greater than $V_{batref}$ ($V_{bat} \geq V_{batref}$), the charger changes the charging cycle to the CV mode or constant voltage phase. The charger continues to charge the battery in the CV mode using a constant voltage until the battery charging current ($I_{bat}$) drops below a pre-set level $I_{term-th}$ as indicated in FIG. 4. In some aspects of the disclosure, $V_{batref}$ is automatically or dynamically adjusted in relation to changing SoH or $SoC_{max}$ so that the charger can apply the proper CC mode and CV mode even when the battery has changed $SoC_{max}$ and SoH due to aging as shown in FIG. 5.

During the initial charging stage (e.g., pre-charge phase), when the battery voltage ($V_{bat}$) is lower than the voltage threshold ($V_{batref}$), the CC mode is used to limit the charging current to a safe level (e.g., $I_{prechg}$). The total amount of charge transferred to the battery during the CC mode is equal to the current-time area under the CC current and is denoted as Qcc in FIG. 6. When $V_{bat} \geq V_{batref}$ is true, the CV mode is used and the charging current will decrease gradually to zero or a very low value. The amount of charge absorbed by the battery under the CV mode is denoted as Qcv in FIG. 6.

In one example, the current SoC at time $t_1$ can be expressed as equation (3).

$$SoC(t_1) = SoC(t_0) + \frac{\eta}{Q_{rated}} \left( \int_{t_0}^{t_1} I_{bat}(t) dt \right) \quad (3)$$

In equation (3), $SoC(t_0)$ is the initial SoC at time $t_0$, $\eta$ is the charging efficiency, and $I_{bat}(t)$ is the charging current.

A k factor may be used to relate $SoC_{ref}(t)$ to $SoC_{max}$ based equation (4).

$$SoC_{ref}(t) = k \cdot SoC_{max}(t) \quad (4)$$

In equation (4), $SoC_{ref}(t)$ is the SoC corresponding to the battery voltage threshold at which CV mode and CC mode change should occur, and $SoC_{max}(t)$ corresponds to the maximum SoC capacity of the battery that may decrease with the operating lifetime and usage of the battery.

Figure 6:
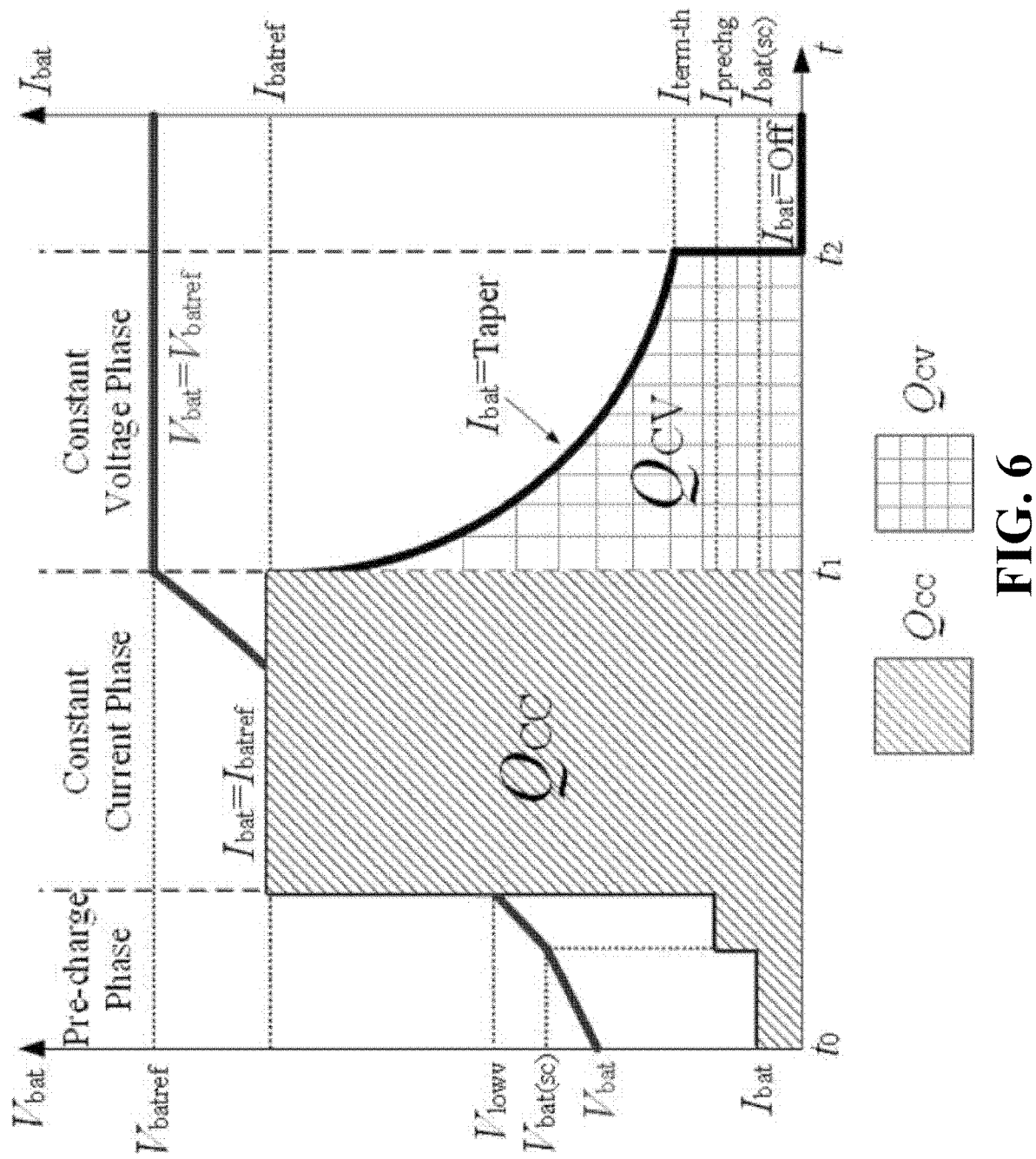
FIG. 6 is a drawing illustrating an exemplary charging profile with the total charge highlighted.

Based on the charges Qcc and Qcv shown in FIG. 6 and using the general form of equation (3), equation (4) can be expressed as equation (5).

$$SoC(t_0) + \frac{\eta}{Q_{rated}} \left( \int_{t_0}^{t_1} I_{bat}(t) dt \right) = \quad (5)$$
$$k \left[ SoC(t_0) + \frac{\eta}{Q_{rated}} \left( \int_{t_0}^{t_2} I_{bat}(t) dt \right) \right]$$

Equation (5) can also be expressed in terms of k and the charge variables as equation (6).

$$Q(t_0) + \eta(Q_{CC}) = k[Q(t_0) + \eta(Q_{CC} + Q_{CV})] \quad (6)$$

From equations (4) and (6), for 0<k<1 (e.g., in the range of 0.8 to 0.95 depending on the nature or type of the battery), the k factor may be expressed as equation (7a) or (7b).

$$k = \frac{SoC(t)}{SoC_{max}(t)} \text{ or} \quad (7a)$$

$$k = \frac{Q(t_0) + \eta Q_{CC}}{Q(t_0) + \eta(Q_{CC} + Q_{CV})} \quad (7b)$$

Figure 7:
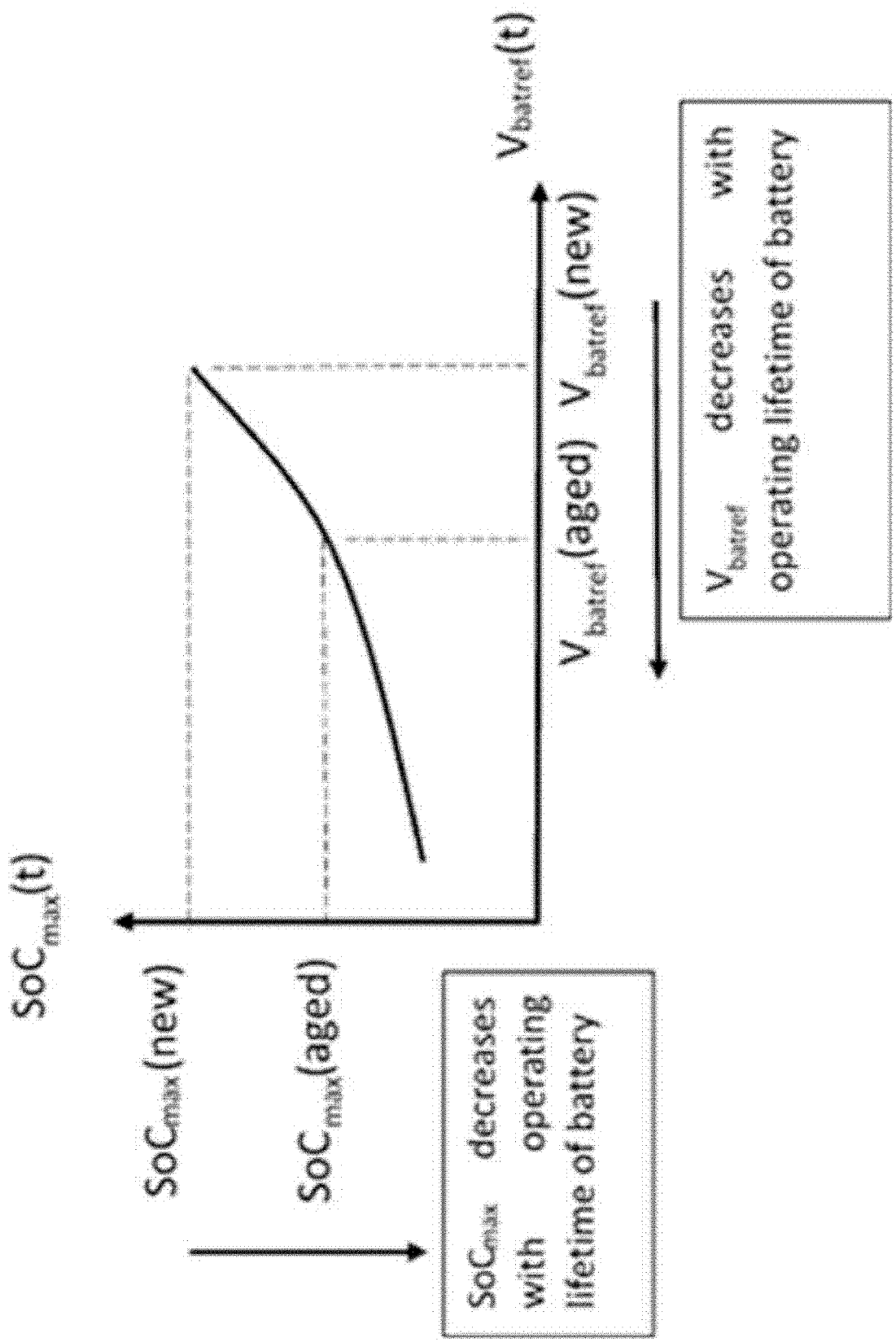
FIG. 7 is a drawing illustrating a mapping between a threshold voltage ($V_{batref}$) and a maximum SoC ($SoC_{max}$) of an exemplary battery according to some aspects of the disclosure.

In some aspects of the disclosure, the charger may regularly or frequently determine or update $SoC_{max}$ during the lifetime of the battery. The charge variables $Q(t_0)$, Qcc, and Qcv may be calculated by various methods known in the art. As the battery ages, the $SoC_{max}$ decreases as illustrated in, for example, FIG. 3. FIG. 7 is a drawing illustrating the relationship or mapping between $V_{batref}$ and $SoC_{max}$. In this example, when $SoC_{max}$ decreases over the lifetime of the battery, the corresponding $V_{batref}$ also decreases. In some aspects of the disclosure, $V_{batref}$ is not a fixed value or constant, but is a variable that may change in relation to $SoC_{max}$ decrease during the lifetime of the battery. In some aspects of the disclosure, by using a battery model to estimate the SoC and $SoC_{max}$ and by setting the k factor of equation (7a) according to the battery type, $V_{batref}$ can be dynamically determined throughout the lifetime of the battery.

In some aspects of the disclosure, the k factor can be selected in a range depending on the type of rechargeable battery (e.g., (e.g., 0.8 to 0.95 for lithium ion battery or the like). As $SoC_{max}(t)$ decreases with the operating lifetime of a particular battery, for a given k factor selected for the battery, the battery voltage ($V_{bat}$) corresponding to an SoC=k $SoC_{max}$ according to equation (7a) may be selected as the battery threshold voltage ($V_{batref}$) at which CC mode and CV mode change should occur during a charging cycle. The $V_{bat}$ may be the voltage across the battery's positive and negative terminal during charging.

Figure 8:
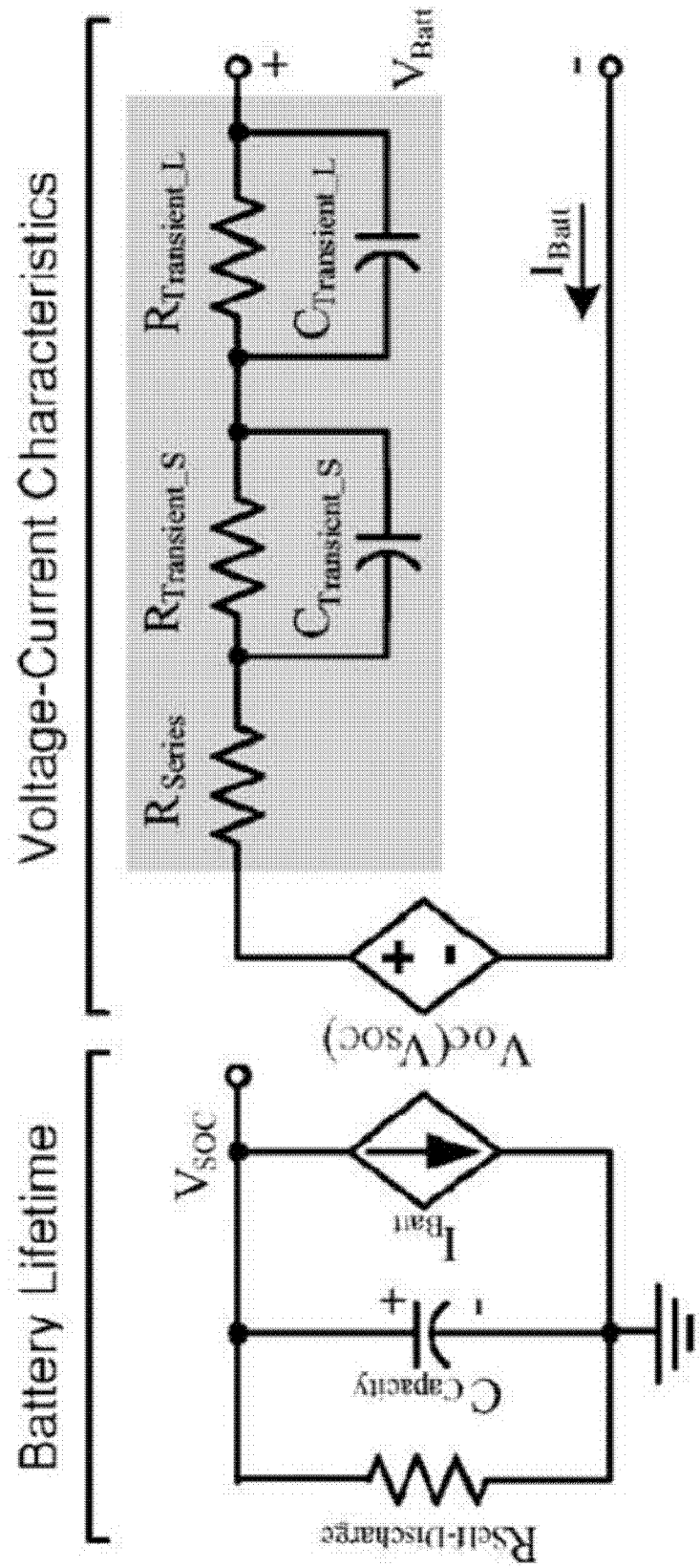
FIGS. 8 and 9 illustrate two exemplary battery circuit models that may be used in the present disclosure to determine the SoC.
Figure 9:
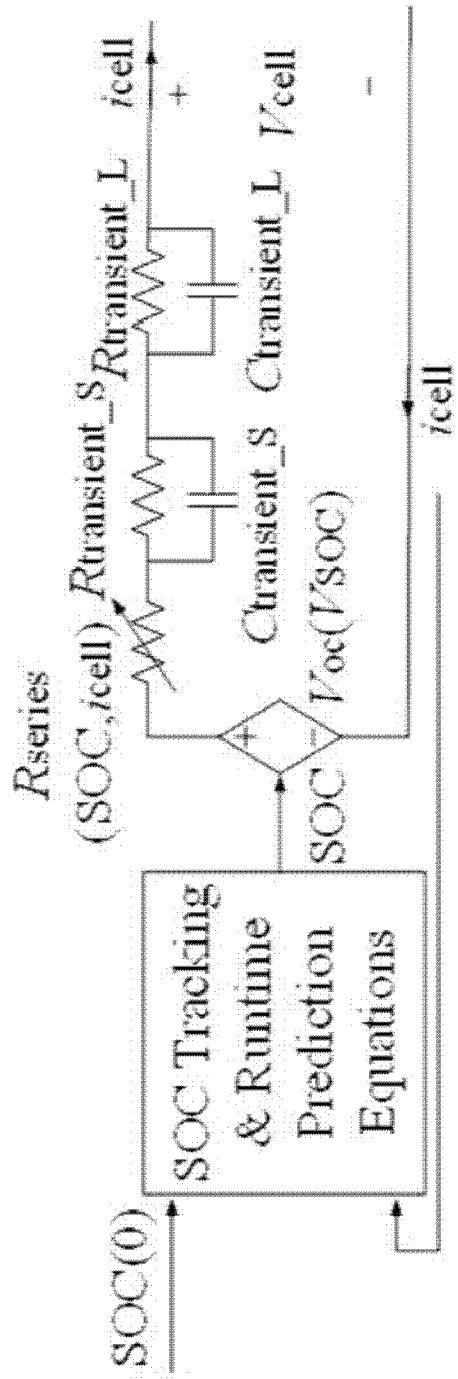

To implement the method of using a frequently updated $V_{batref}$ for controlling CC mode and CV mode change, a charging controller (e.g., controller 206 of FIG. 2) may use a suitable battery model to estimate the SoC, $SoC_{max}$, and their corresponding mapping with the battery voltage $V_{bat}$. FIGS. 8 and 9 illustrate two exemplary battery circuit models that may be used in the present disclosure to determine SoC and $SoC_{max}$. However, the present disclosure is not restricted to any particular battery model. Any suitable battery model that can provide acceptable accuracy in the estimation of SoC, $SoC_{max}$, and their mapping with the battery voltage can be used.

In addition, the $SoC_{max}$ is related to the SoH of the battery. As described above, the maximum SoC capability of a battery at a given time, $SoC_{max}(t)$, and the corresponding battery voltage threshold ($V_{batref}(t)$) at which CC mode and CV mode change occurs will change when the battery ages. One exemplary way to define current SoH (SoH(t)) is expressed as equation (8).

$$SoH(t) = SoC_{max}(t) = \frac{Q_{max}}{Q_{rated}} \quad (8)$$

In one aspect of the present disclosure, a charging procedure treats the battery threshold voltage $V_{batref}(t)$ as a variable that is related or mapped to the current maximum SoC ($SoC_{max}(t)$). Equations (9a) and (9b) are examples that illustrate the relationship between $V_{batref}(t)$ and SoC(t)/SoH(t).

$$V_{batref}(t) \rightarrow k \cdot SoC_{max}(t) \quad (9a)$$

$$V_{batref}(t) \rightarrow k \cdot SoH(t) \quad (9b)$$

In some aspects of the disclosure, the above-described charging procedure can be applied to wired or wireless charging systems such that a more accurate and optimal battery voltage threshold can be used to switch from CC mode to CV mode or vice versa.

Figure 10:
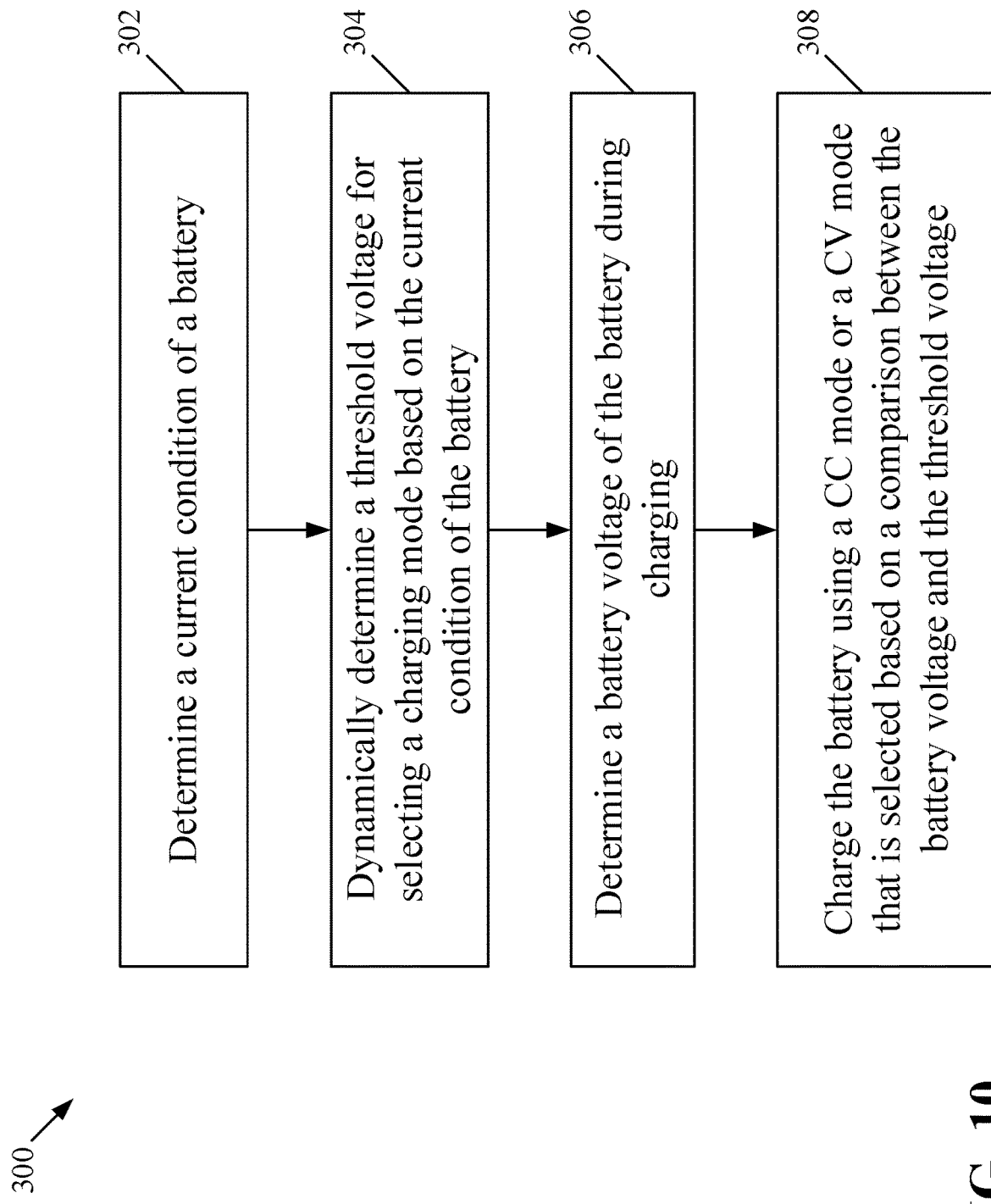
FIG. 10 is a flowchart illustrating an exemplary charging procedure using a dynamically updated threshold voltage for selecting a charging mode according to some aspects of the present disclosure.

FIG. 10 is a flowchart illustrating an exemplary charging procedure 300 using a dynamically updated threshold voltage ($V_{batref}$) for selecting a charging mode. The procedure 300 may be implemented using a wired or wireless charging system (e.g., battery charging system 202 or wireless charging system 400). At block 302, a charging system (e.g., controller 206) determines a current condition of the battery. For example, the current condition may be the current SoH (e.g., SoH(t)) or maximum SoC of a battery that indicates the current condition (e.g., degradation of SoH) of a battery (e.g., battery 204) over a period of time or usage. In some examples, the current SoH may be equal to the current $SoC_{max}$ (e.g., $SoC_{max}(t)$). The current SoH may be determined using equation (8) as described above.

At block 304, the charging system dynamically determines a threshold voltage (e.g., $V_{batref}$) for selecting a charging mode (e.g., CC mode and CV mode) based on the current condition (e.g., SoH(t)) of the battery. Dynamically determining the threshold voltage means that the threshold voltage is not fixed and can be changed based on other factors such as the current SoH or $SoC_{max}$. For example, the threshold voltage may be determined using equation 9(a) or 9(b) described above in real time or frequently. At block 306, the charging system determines a battery voltage of the battery during charging. The battery voltage may be a voltage measured across the battery terminals or estimated based on certain front-end charger parameters (e.g., primary charging current and voltage or a wireless charger). At block 308, the charging system charges the battery using a CC mode or a CV mode that is selected based on a comparison between the battery voltage and the threshold voltage. For example, when the battery voltage is less than the threshold voltage, the CC mode is selected; but when the battery voltage is equal to or greater than the threshold voltage, the CV mode is selected. Because the threshold voltage is dynamically updated in consideration of changing SoH/$SoC_{max}$ due to battery usage and aging, the charging system can switch between CC mode and CV mode at the optimal battery voltage to prolong battery life.

Figure 11:
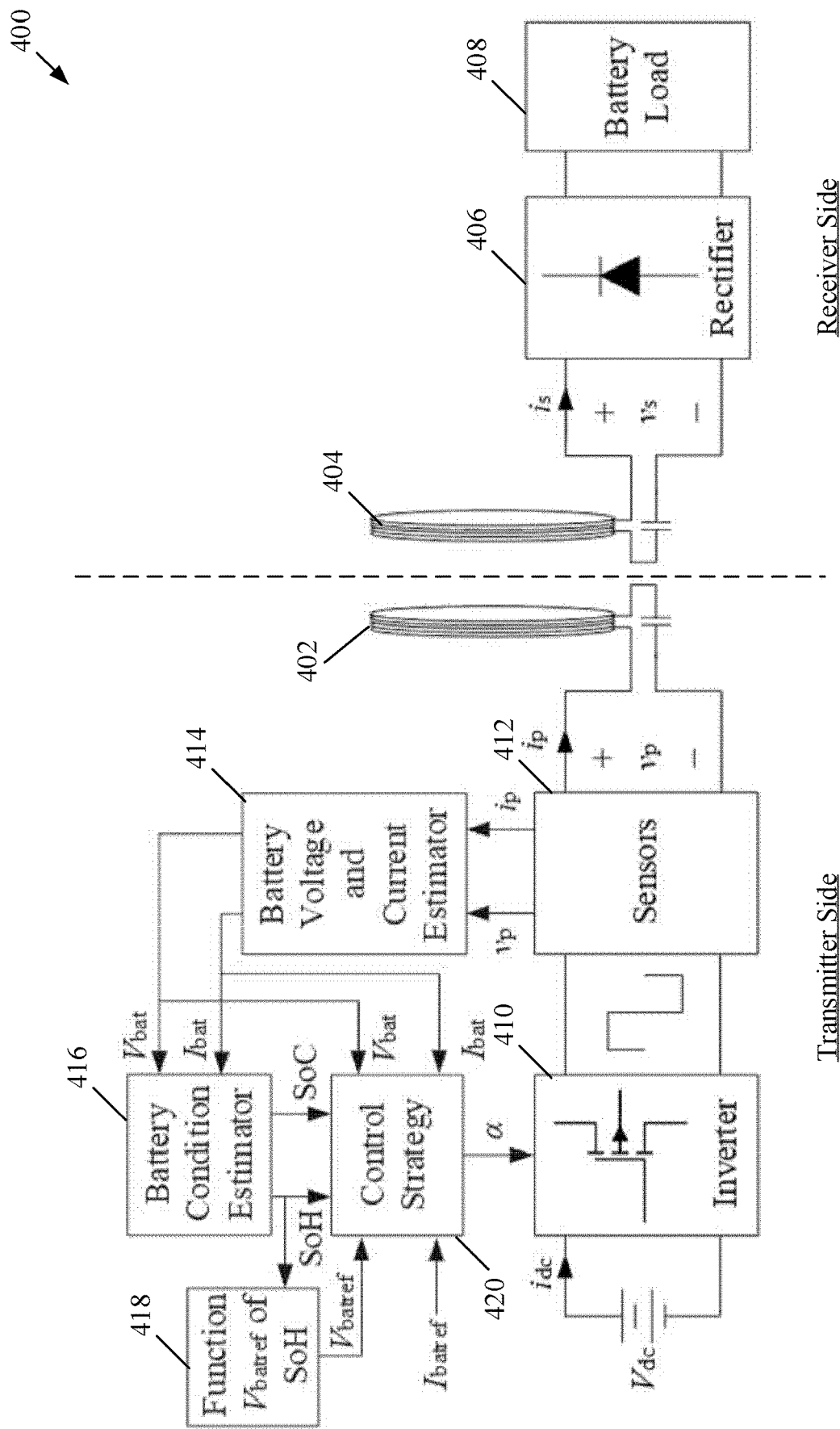
FIG. 11 is a block diagram illustrating an exemplary wireless charging system according to some aspects of the disclosure.

FIG. 11 is a block diagram illustrating an exemplary wireless charging system 400 according to some aspects of the disclosure. A wireless charging system may also be called a wireless power transfer (WPT) system. The wireless charging system 400 may be implemented using simple series-series LC resonant circuits without involving higher order resonant circuits such as LCC or LLC resonant tanks. However, it will be explained in the present disclosure below that, for a series LC resonant circuit used in the receiver, the present disclosure can be generalized to cover a transmitter circuit that can adopt a parallel (P), series (S), LCC, or LLC resonant tank.

The wireless charging system 400 automatically selects a constant-current (CC) mode and constant-voltage (CV) mode for charging a battery load using a fixed inverter switching frequency. The wireless charging system 400 is configured to use front-end (transmitter-side) monitoring and control methods to estimate system parameters and/or battery load conditions, thus eliminating the need for a wireless communication system for feedback control purposes. The wireless charging system 400 is configured to monitor SoC and/or SoH changes of the battery in real time or frequently based on transmitter-side monitoring (i.e., using only information available in the transmitter side). The wireless charging system 400 uses the frequently (e.g., periodically) updated SoC/SoH information and its corresponding battery voltage (including aging effects) in transmitter-side control to determine the threshold voltage ($V_{batref}$) for selecting CC mode and CV mode during charging, as well as for limiting the maximum SoC in order to prolong battery lifetime. Unlike other charging methods, the wireless charging system 400 updates the relationship between $V_{batref}$ and SoC/SoH in real time or frequently. To that end, $V_{batref}$ is not a constant, fixed, or predetermined value, but changes with the aging effects and usage of the battery.

Referring to FIG. 11, the wireless charging system 400 may be configured to charge the battery (battery load) in the CC mode or CV mode using the charging profile shown in FIG. 4. The wireless charging system 400 has a transmitter-side portion and a receiver-side portion. The transmitter-side portion is configured to wirelessly transmit power via a coil resonator 402 to a corresponding coil resonator 404 at the receiver-side portion. The receiver-side portion includes a rectifier 406 and a battery load 408. The rectifier 406 directly charges the battery load 408 without using an extra charging controller and/or voltage converter. That is, the wireless charging system 400 does not need an extra battery management system or voltage controller between the rectifier output and the battery load 408. The transmitter-side portion further includes a power inverter 410 that converts DC power ($V_{dc}$) to AC power to drive the coil resonator 402. A sensor block 412 is configured to measure the primary voltage ($v_p$) and primary current ($i_p$) that drive the coil resonator 402. The transmitter-side portion further includes a battery voltage and current estimator 414, a battery condition estimator 416, a threshold voltage generator 418, and a charging controller 420.

Figure 12:
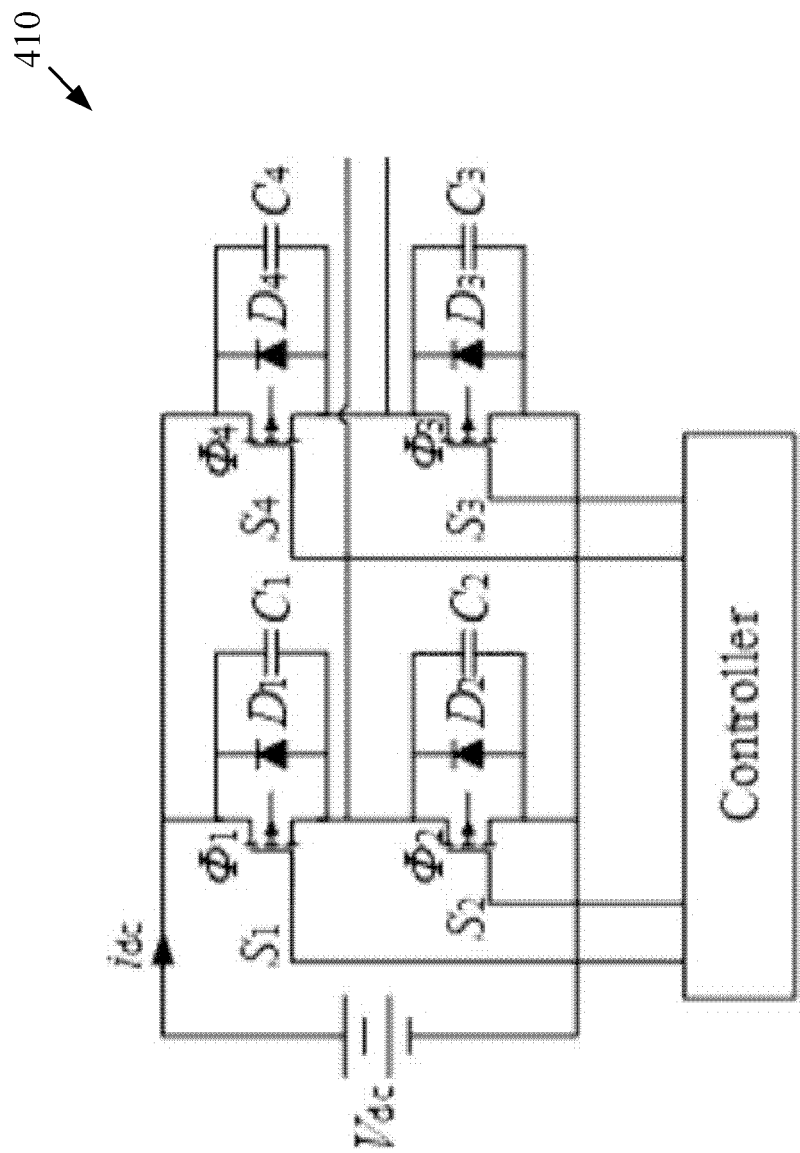
FIG. 12 is a diagram illustrating an exemplary power inverter circuit.

In one example, the power inverter 410 comprises a full inverter bridge (see FIG. 12) with 4 power switches (e.g., S1, S2, S3, and S4). The gating signals of the four switches may have a zero phase-shift angle (i.e., $\alpha=0$; e.g., FIG. 13) or a positive phase-shift angle (i.e., $\alpha>0$; e.g., FIG. 14). In general, the diagonal pair of the switches (e.g., S1 and S3, S2 and S4) are switched together. When S1 and S3 are turned on, S2 and S4 are turned off, and vice versa. In some implementations, a small dead time may be included between the changes of switching states in order to provide soft-switching conditions for reducing switching power losses. This dead time is typically much smaller than the switching period of the inverter and is therefore not shown in FIG. 13 and FIG. 14.

Figures 13, 14:
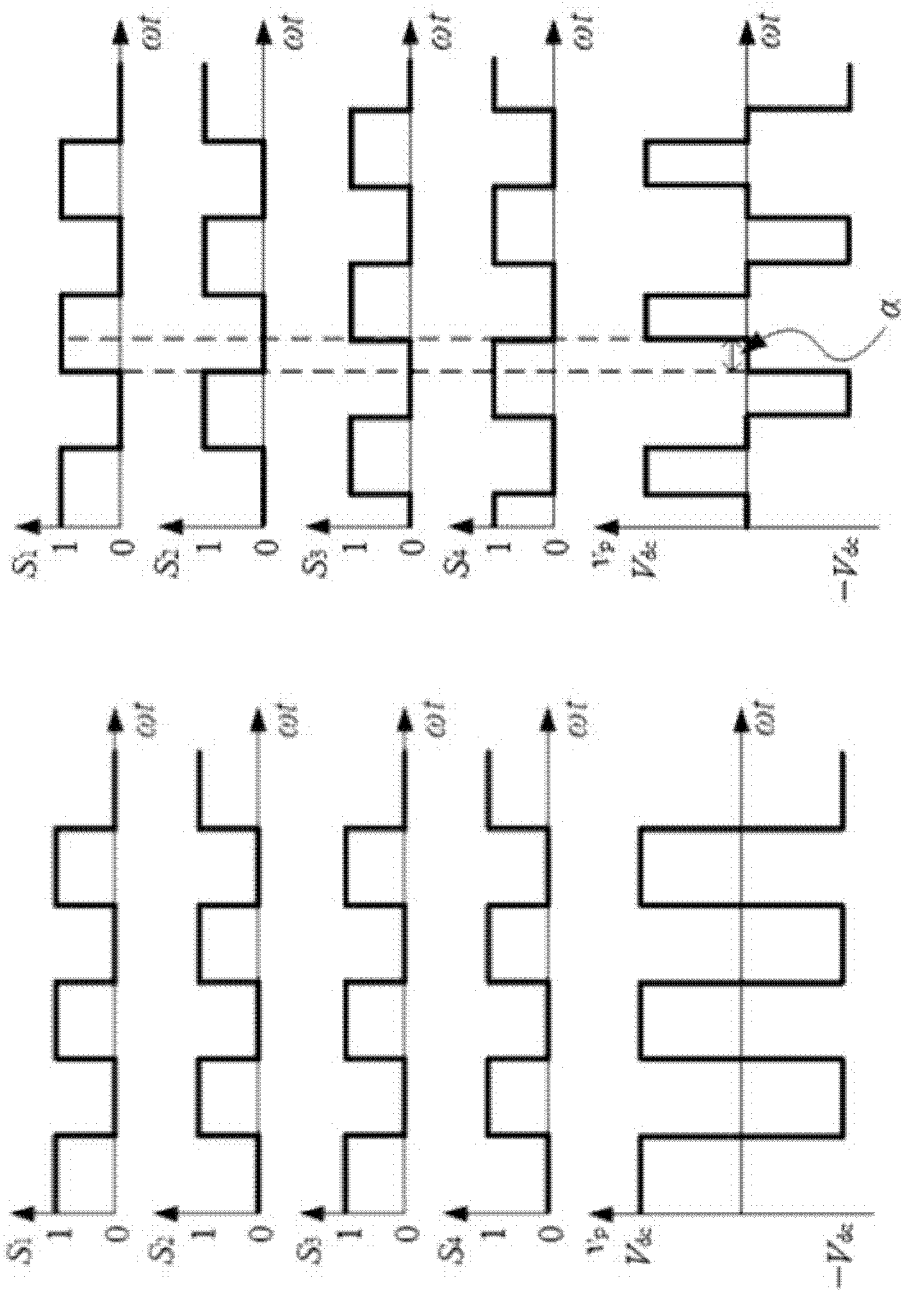
FIGS. 13 and 14 are drawings illustrating exemplary control signals of a power inverter circuit according to some aspects of the present disclosure.

In this example, the DC voltage input ($V_{dc}$) of the inverter is assumed to be constant. When the phase-shift angle $\alpha$ is zero ($\alpha=0$), the inverter's output voltage is a rectangular waveform with the maximum magnitude (see FIG. 13). When the phase-shift angle $\alpha$ is increased, the magnitude of the inverter's output voltage is reduced as shown in FIG. 14. Therefore, the inverter's output voltage can be controlled by changing the phase-shift angle $\alpha$. For example, the magnitude of the inverter output voltage can be reduced by increasing $\alpha$, and vice versa. It should be noted that the larger $\alpha$ is, the more derivation from a rectangular voltage waveform in the output voltage of the inverter becomes, and more harmonic content is present in the output voltage. Hence, the voltage harmonic content increases with an increasing α. This inverter output voltage is applied to the primary coil-resonator in the transmitter circuit.

Figure 15:
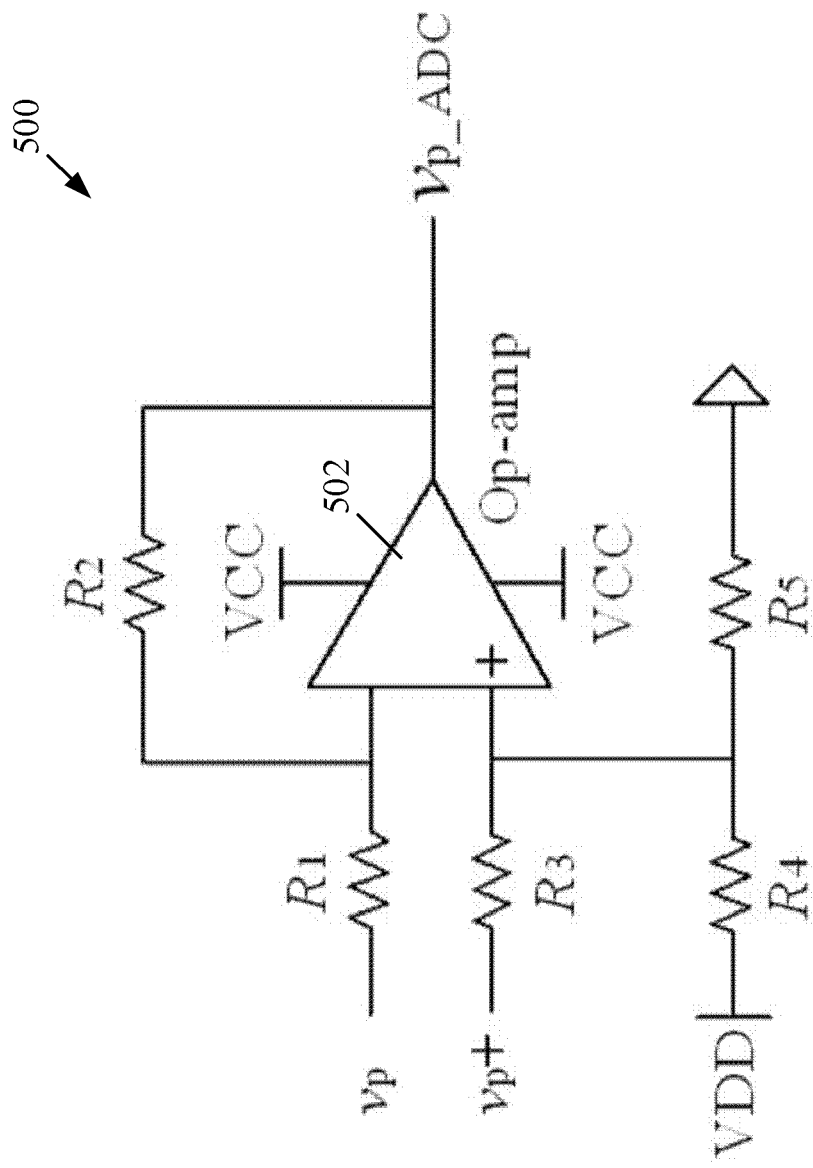
FIG. 15 is a diagram illustrating an exemplary voltage sensor according to some aspects of the present disclosure.

The battery voltage and current estimator 414 (C-V estimator) determines or estimates the battery's voltage ($V_{bat}$) and current ($I_{bat}$) using a front-end monitoring method based solely on the information of the primary voltage ($v_p$) and primary current ($i_p$) measured by the sensors (e.g., sensor block 412), without relying on any feedback from the receiver side. FIG. 15 is a diagram illustrating an exemplary voltage sensor circuit 500 that can be used to determine $V_{bat}$. FIG. 16 is a diagram illustrating exemplary current sensor circuits 600 and 602 that can be used to determine $I_{bat}$. For example, the $V_{bat}$ can be derived from the output voltage $V_{p\_ADC}$ of the op-amp 502 and the output current $I_{p\_ADC}$ of the op-amp 602.

Figure 17:
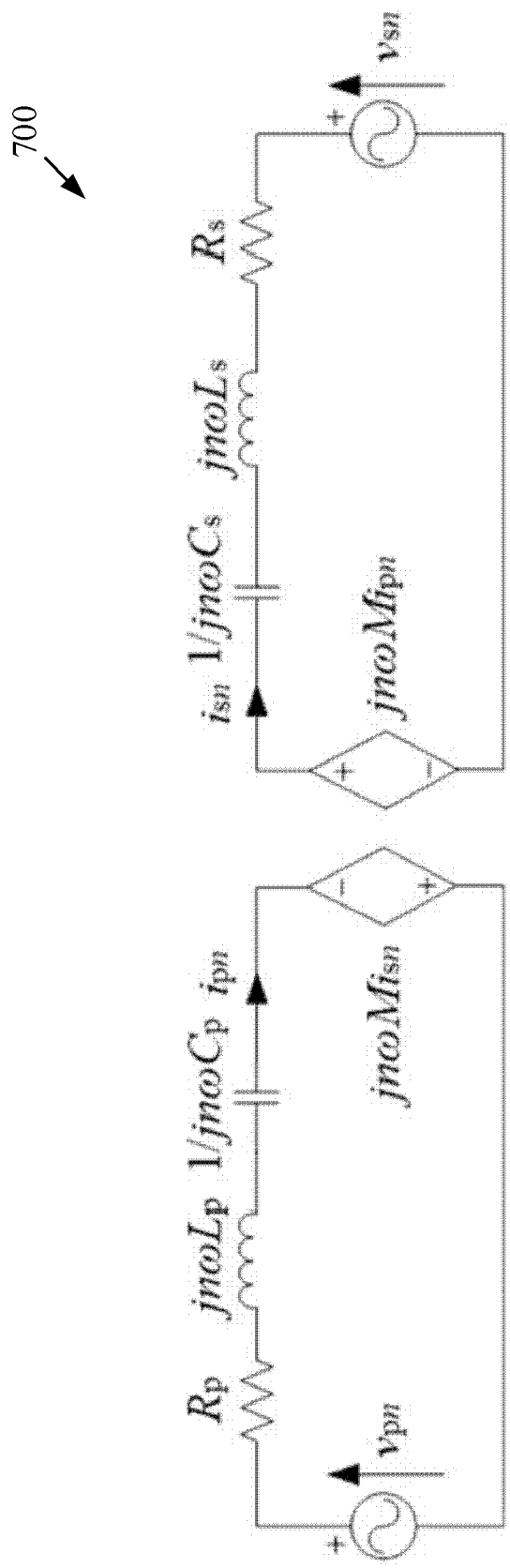
FIG. 17 is a simplified equivalent circuit of a portion of the wireless charging system of FIG. 11, according to some aspects of the present disclosure.

FIG. 17 is an example of a simplified equivalent circuit 700 of a portion of the wireless charging system 400 shown as a series-series LC compensated wireless power transfer circuit. Referring to FIG. 17, the currents $i_{pn}$ and $i_{sn}$ refer to the n-th harmonic of the primary current and the secondary current, respectively. The voltage $v_{pn}$ refers to the n-th harmonic of the primary voltage applied to the primary coil-resonator (e.g., coil resonator 402). The voltage $v_{sn}$ is the n-th harmonic of the secondary output voltage applied to the rectifier and the battery load. The voltages $v_{pn}$ and $v_{sn}$ can be expressed in equation (15).

$$\begin{cases} v_{pn} = Z_{pn}i_{pn} - jn\omega M i_{sn} \\ -v_{sn} = Z_{sn}i_{sn} - jn\omega M i_{pn} \end{cases} \quad (15)$$

In equation (15), $$Z_{pn} = jn\omega L_p + \frac{1}{jn\omega C_p} + R_p \text{ and } Z_{sn} = jn\omega L_s + \frac{1}{jn\omega C_s} + R_s.$$

Then, the n-order harmonics components $i_{sn}$ and $v_{sn}$ can be estimated based on $i_{pn}$ and $v_{pn}$ in equations (16.1) and (16.2).

$$i_{sn} = \frac{Z_{pn}}{jn\omega M}i_{pn} - \frac{1}{jn\omega M}v_{pn} \quad (16.1)$$

$$v_{sn} = \frac{Z_{sn}}{jn\omega M}v_{pn} - \frac{n^2\omega^2 M^2 + Z_{pn}Z_{sn}}{jn\omega M}i_{pn} \quad (16.2)$$

The amplitudes of $i_{sn}$ and $v_{sn}$ can be further derived as equations (17.1) and (17.2).

$$|i_{sn}| = \left|\frac{Z_{pn}}{jn\omega M}i_{pn} - \frac{1}{jn\omega M}v_{pn}\right| \quad (17.1)$$

$$|v_{sn}| = \left|\frac{Z_{sn}}{jn\omega M}v_{pn} - \frac{n^2\omega^2 M^2 + Z_{pn}Z_{sn}}{jn\omega M}i_{pn}\right| \quad (17.2)$$

In equations (17.1) and (17.2), the operator |·| indicates the amplitude of the signal. Besides, the current and voltage of the battery load, $I_{bat}$ and $V_{bat}$, can be estimated based on $i_{sn}$ and $v_{sn}$ using Fourier-series-expansion as shown in equations (18.1) and (18.2).

$$I_{bat} \approx \sum \frac{2}{n\pi}|i_{sn}| (n = 1, 3, \ldots N) \quad (18.1)$$

$$V_{bat} \approx \sum \frac{n\pi}{2(N+1)}|v_{sn}| - 2\nabla_D (n = 1, 3, \ldots N) \quad (18.2)$$

In one aspect of the disclosure, the battery load current $I_{bat}$ and voltage $V_{bat}$ can be estimated based on the front-end measurements $i_{pn}$ and $v_{pn}$ as expressed below in equations (19.1) and (19.2).

$$I_{bat} \approx \sum \left|\frac{2Z_{pn}}{j\pi n^2 \omega M}i_{pn} - \frac{2}{j\pi n^2 \omega M}v_{pn}\right| (n = 1, 3, \ldots N) \quad (19.1)$$

$$V_{bat} \approx \frac{\pi}{2(N+1)}\sum \left|\frac{Z_{sn}}{j\omega M}v_{pn} - \frac{n^2\omega^2 M^2 + Z_{pn}Z_{sn}}{j\omega M}i_{pn}\right| - 2V_D \quad (19.2)$$

$$(n = 1, 3, \ldots N)$$

In case of the fundamental harmonics components of the resonators are dominant (n=1), the first-order approximation equations can be expressed as equations (20.1) and (20.2).

$$I_{bat} = \left|\frac{2Z_{p1}}{j\pi\omega M}i_{p1} - \frac{2}{j\pi\omega M}v_{p1}\right| \quad (20.1)$$

$$V_{bat} = \left|\frac{\pi Z_{s1}}{j4\omega M}v_{p1} - \frac{\pi\omega^2 M^2 + \pi Z_{p1}Z_{s1}}{j4\omega M}i_{p1}\right| - 2V_D \quad (20.2)$$

Furthermore, at the resonant frequency ($\omega=\omega_o$), the equivalent input impedance $Z_{in}$ is purely resistive, such that $v_{p1}$ and $i_{p1}$ are in phase. Therefore, $I_{bat}$ and $V_{bat}$ can be estimated at the resonant frequency ($\omega=\omega_o$) by simplified equations (21.1) and (21.2).

$$I_{bat} = \left|\frac{2R_p}{\pi\omega_o M}|i_{p1}| - \frac{2}{\pi\omega_o M}|v_{p1}|\right| (\omega = \omega_o), \quad (21.1)$$

$$V_{bat} = \left|\frac{\pi R_s}{4\omega_o M}|v_{p1}| - \frac{\pi\omega_o^2 M^2 + \pi R_p R_s}{4\omega_o M}|i_{p1}|\right| - 2V_D \ (\omega = \omega_o) \quad (21.2)$$

In most cases, the battery voltage $V_{bat}$ is much greater than $V_D$ ($V_o \gg 2V_D$) and the equivalent series resistors (ESRs) of the resonators are small ($\omega_o^2 M^2 \gg R_{p1}R_{s1}$). $V_D$ is the diode voltage drop of the diode-bridge rectifier (e.g., rectifier 406). The estimation equation for the output voltage at the resonant frequency ($\omega=\omega_o$) can be further simplified as equation (22).

$$V_{bat} = \left|\frac{\pi R_s}{4\omega_o M}|v_{p1}| - \frac{\pi\omega_o M}{4}|i_{p1}|\right| (\omega = \omega_o) \quad (22)$$

Besides, for the inverter, based on the Fourier-series-expansion, $$|v_{pn}| = \frac{4V_{dc}}{n\pi}\cos\left(\frac{n\alpha}{2}\right). \quad (23)$$

In equation (23), α is the phase shift angle. The equivalent input impedance $Z_{in}$ expressed in equation (24).

$$Z_{in} = Z_{pn} + \frac{n^2\omega^2 M^2}{Z_{sn} + R_{eq}}. \quad (24)$$

In equation (24), $R_{eq}$ is the equivalent resistance of the battery load and the diode-bridge rectifier, $$R_{eq} \approx \frac{8(V_{bat} + 2V_D)}{\pi^2 I_{bat}}$$

Substitute equations (18) and (19) into equations (20), the full-order estimation model of battery current and voltage can be expressed by equations (25.1) and (25.2).

$$I_{bat} = \frac{8V_{dc}\omega M}{\pi^2} \sum \left| \frac{\cos\left(\frac{n\alpha}{2}\right)}{nj(-Z_{pn}Z_{sn} - Z_{pn}R_{eq} - n^2\omega^2 M^2)} \right| \quad (25.1)$$

$$(n = 1, 3, \ldots N)$$

$$V_{bat} \approx \frac{2\omega M V_{dc}}{N+1} \sum \left| \frac{nR_{eq}\cos\left(\frac{n\alpha}{2}\right)}{j(-Z_{pn}Z_{sn} - Z_{pn}R_{eq} - n^2\omega^2 M^2)} \right| - 2V_D \quad (25.2)$$

$$(n = 1, 3, \ldots N)$$

Using equations (25.1) and (25.2), $I_{bat}$ and $V_{bat}$ can be regulated by controlling the phase shift angle $\alpha$. In some aspects of the disclosure, CC mode control can be implemented using equation (25.1), and CV mode control can be implemented using equation (25.2).

The ratio of $I_{bat}$ and $V_{dc}$ is defined as a transconductance $G_I$.

$$G_I(\omega) = \frac{I_{bat}}{V_{dc}} = \frac{8\omega M}{\pi^2} \sum \left| \frac{\cos\left(\frac{n\alpha}{2}\right)}{j(-Z_{pn}Z_{sn} - Z_{pn}R_{eq} - n^2\omega^2 M^2)} \right| \quad (26.1)$$

$$(n = 1, 3, \ldots N)$$

The ratio of $V_o + 2V_D$ and $V_{dc}$ is defined as a voltage transfer ratio $G_V$.

$$G_V(\omega) = \quad (26.2)$$

$$\frac{V_{bat} + 2V_D}{V_{dc}} = \frac{2\omega M}{N+1} \sum \left| \frac{nR_{eq}\cos\left(\frac{n\alpha}{2}\right)}{j(-Z_{pn}Z_{sn} - Z_{pn}R_{eq} - n^2\omega^2 M^2)} \right|$$

$$(n = 1, 3, \ldots N)$$

In case of the fundamental harmonics components of the resonators are dominant (N=1), $G_V$ and $G_I$ can be expressed as equations (27.1) and (27.2).

$$G_I(\omega) = \frac{8\omega M}{\pi^2} \left| \frac{\cos\left(\frac{\alpha}{2}\right)}{j(-Z_{p1}Z_{s1} - Z_{p1}R_{eq} - \omega^2 M^2)} \right| (\omega = \omega_o) \quad (27.1)$$

-continued $$G_V(\omega) = \omega M \left| \frac{R_{eq}\cos\left(\frac{\alpha}{2}\right)}{j(-Z_{p1}Z_{s1} - Z_{p1}R_{eq} - \omega^2 M^2)} \right| (\omega = \omega_o) \quad (27.2)$$

Furthermore, at the resonant frequency ($\omega=\omega_o$), $G_I$ and $G_V$ can be expressed as equations (28.1) and (28.2).

$$G_I(\omega_o) = \frac{8\omega_o M \cos\left(\frac{\alpha}{2}\right)}{\pi^2(R_{p1}R_1 + R_{p1}R_{eq} + \omega_o^2 M^2)} \quad (\omega = \omega_o) \quad (28.1)$$

$$G_V(\omega_o) = \frac{\omega_o M R_{eq}\cos\left(\frac{\alpha}{2}\right)}{R_{p1}R_{s1} + R_{p1}R_{eq} + \omega_o^2 M^2} \quad (\omega = \omega_o) \quad (28.2)$$

In most cases, the first-order estimation equation (20.1) can accurately estimate $I_{bat}$ even if high-order harmonics exist. Therefore, CC mode control can use the first-order estimation equation:

$$I_{bat} = \left| \frac{2Z_{p1}}{j\pi\omega M} i_{p1} - \frac{2}{j\pi\omega M} v_{p1} \right|.$$

However, in some aspects of the disclosure, the full-order estimation equation (19.1) described above may also be used to determine $I_{bat}$ for CC mode control.

However, for most cases, the voltage transfer ratio increases when harmonics components increase. Therefore, CV mode control uses the full-order estimation equation (19.2).

$$V_{bat} \approx \frac{\pi}{2(N+1)} \sum \left| \frac{Z_{sn}}{j\omega M} v_{pn} - \frac{n^2\omega^2 M^2 + Z_{pn}Z_{sn}}{j\omega M} i_{pn} \right| - 2V_D$$

$$(n = 1, 3, \ldots N)$$

In some aspects of the disclosure, for acceptable accuracy, N may be equal to or greater than 3 (e.g., N ≥ 5).

Using the above-derived equations, the charging system 400 can use transmitter-side control for controlling battery current ($I_{bat}$) in CC mode and battery voltage ($V_{bat}$) in CV mode based on solely electrical variables ($v_p$ and $i_p$) measurable in the primary or transmitter side circuit.

Transmitter-Side Battery Condition Estimation

The battery condition estimator 416 (FIG. 11) is configured to determine the current SoC and SoH in real time or frequently using a suitable method and battery model. Some non-limiting exemplary methods include a Coulomb counting method (or enhanced Coulomb counting method), a voltage method (including open-circuit voltage method), Kalman filter (or extended Kalman filter), impedance spectroscopy, and heuristic algorithm based on a battery model. The choice of the battery model depends on the complexity and/or accuracy of the model and also the computing capability of the processor used in the controller (e.g., battery condition estimator 416).

Using Coulomb Counting Method to Estimate SoC

In one aspect of the disclosure, the charging system 400 may be configured to use a transmitter-side monitoring method for determining the current SoC and SoH in real time or frequently using a Coulomb counting method and a hybrid battery model. The SoC may be determined using a Coulomb counting method according to equation (3), which is repeated below.

$$SoC(t_1) = SoC(t_0) + \frac{\eta}{Q_{rated}} \left( \int_{t_0}^{t_1} I_{bat}(t) dt \right) \quad (3)$$

$SoC(t_0)$: initial SoC
$\eta$: charging efficiency

In step one of the method, the output voltage and current of the battery load, i.e., $V_{bat}$ and $I_{bat}$ can be estimated based on equations (19.2) and (19.1) for every predetermined time interval periodically. Using an exemplary 5 minutes interval, five $V_{bat}$ values can be obtained in 20 minutes, ($V_{bat}(t_0)$, $V_{bat}(t_1)$, $V_{bat}(t_2)$, $V_{bat}(t_3)$, $V_{bat}(t_4)$. The corresponding SoCs ($SoC(t_0)$, $SoC(t_1)$, $SoC(t_2)$, $SoC(t_3)$, $SoC(t_4)$) of the battery load can be estimated at the front-end based on the front-end estimated $V_{bat}$ and $I_{bat}$. In some aspects of the disclosure, the correspondences or mappings between $V_{bat}$ and SoC may be determined via offline tests or predetermined. In some examples, accurate estimations of SoCs may use an offline tested look-up-table based on the open-circuit battery voltage $V_{bat}$ measured after a long period of rest time. Thus, in some examples, linear fitting techniques may be used for mapping $V_{bat}$ and $I_{bat}$ to their corresponding SoCs to reduce the estimation errors.

In step 2 of the method, based on the estimated SoCs (e.g., $SoC(t_0)$, $SoC(t_1)$, $SoC(t_2)$, $SoC(t_3)$, $SoC(t_4)$) and constant output current of the battery load $I_{bat}$, the SoCs are adjusted with linear fitting. According to the adjusted SoCs and $I_{bat}$, the charging efficiency $\eta$ and the rated electric quantity $Q_{rated}$ can be determined based on equations (1) and (3).

In step 3 of the method, based on the known $SoC(t_0)$, $\eta$, and $Q_{rated}$, real-time monitoring of SoC of the battery load at the front-end can be achieved.

In step 4 of the method, the SoH of the battery can be determined at the end of the charging cycle as SoH=SoC.

Using a Heuristic Algorithm to Estimate SoC and SoH

In another aspect of the disclosure, the charging system 400 may be configured to use a transmitter-side monitoring method for determining SoC and SoH in real time using a heuristic algorithm based on a hybrid battery model. An example of the hybrid model equivalent circuit is shown in FIG. 9. The parameters of the hybrid battery model can be expressed by equations (30-1, 30-2, 30-3, 30-4, 30-5, 30-6) below.

$$V_{oc}[SoC(t)] = a_0 e^{-a_1 SoC(t)} + a_2 + a_3 SoC(t) - a_4 SoC^2(t) + a_5 SoC^3(t) \quad (30\text{-}1)$$

$$V_{bat}(t) = V_{oc}[SoC(t)] - I_{bat}(t) R_{series} - V_{transient}(t) \quad (30\text{-}2)$$

$$V_{transient}(t) = V_{transient\_s}(t) + V_{transient\_L}(t) \quad (30\text{-}3)$$

$$V_{transient\_s}(t) = \begin{cases} R_{transient\_s} I_{bat}(t) \left[ 1 - e^{\frac{-(t-t_0)}{\tau_s}} \right] & t_0 < t < t_d \\ V_{transient\_s}(t_d) e^{\frac{-(t-t_d)}{\tau_s}} & t_d < t < t_r \end{cases} \quad (30\text{-}4)$$

$$V_{transient\_L}(t) = \begin{cases} R_{transient\_L} I_{bat}(t) \left[ 1 - e^{\frac{-(t-t_0)}{\tau_L}} \right] & t_0 < t < t_d \\ V_{transient\_L}(t_d) e^{\frac{-(t-t_d)}{\tau_L}} & t_d < t < t_r \end{cases} \quad (30\text{-}5)$$

$$\begin{cases} R_{series} = b_0 e^{-b_1 SoC(t)} + b_2 + b_3 SoC(t) - b_4 SoC(t)^2 + b_5 SoC(t)^3 \\ R_{transient\_s} = c_0 e^{-c_1 SoC} + c_2 \\ C_{transient\_s} = d_0 e^{-d_1 SoC} + d_2 \\ R_{transient\_L} = e_0 e^{-e_1 SoC} + e_2 \\ C_{transient\_L} = f_0 e^{-f_1 SoC} + f_2 \end{cases} \quad (30\text{-}6)$$

The parameters of the hybrid battery model, including $a_0$, $a_1$, $a_2$, $a_3$, $a_4$, $a_5$, $b_0$, $b_1$, $b_2$, $b_3$, $b_4$, $b_5$, $c_0$, $c_1$, $c_2$, $d_0$, $d_1$, $d_2$, $e_0$, $e_1$, $e_2$, $f_0$, $f_1$, and $f_2$, are approximately constant when the SoC is high (e.g., between 20% and 100%) and change exponentially when the SoC varies below a certain value (e.g., between 0% and 20%) due to the electrochemical reaction of the battery load. Without using any offline measurements and look-up tables, the parameters of the battery load can be periodically or frequently updated and the SoC of the battery load can be estimated based on the hybrid model equations (1), (3), (30) using known heuristic algorithms, e.g., Genetic Algorithm, Particle Swarm Optimization, Artificial Neural Network, Swarm Intelligence, Tabu Search, Simulated Annealing, Support Vector Machines, and Differential Evolution. Then, the SoH of the battery load can be determined at the end of the charge by SoH=SoC.

In step 1 of the method, several output voltages and currents of the battery load, e.g. $V_{bat}$=[$V_{bat}(t_0)$, $V_{bat}(t_1)$, $V_{bat}(t_2)$, . . . , $V_{bat}(t_n)$], $I_{bat}$=[$I_{bat}(t_0)$, $I_{bat}(t_1)$, $I_{bat}(t_2)$, . . . , $I_{bat}(t_n)$] are measured over a period of time. In step 2 of the method, formulas or equations can be derived based on the hybrid battery model to calculate the ideal output voltages of the battery load $V_{batest}$ using the measured $I_{bat}$. In step 3 of the method, the SoC of the battery load can be estimated using heuristic algorithms to minimize the norm of the difference between $V_{bat}$ and $V_{batest}$. In step 4 of the method, the SoH of the battery can be determined at the end of the charge by SoH=SoC.

Transmitter-Side Monitoring and Control Scheme for Updating Voltage Threshold

The threshold voltage generator 418 is configured to update the threshold voltage $V_{batref}$ for selecting CC mode and CV mode during a charging cycle. The threshold voltage generator 418 can adjust or update $V_{batref}$ in response to the changing SoH/SoC so that the CC mode and CV mode can be selected appropriately in view of the aging effects of the battery due to decreasing full SoC capability (i.e., $SoC_{max}$) as the battery ages with time.

As previously described in relation to FIG. 3, the maximum SoC capability, $SoC_{max}(t)$ and its corresponding voltage threshold ($V_{batref}(t)$) at which CC mode and CV mode change occurs, will change with time and aging of the battery. In one aspect of the disclosure, the current SoH ($SoH(t)$) can be expressed as equation (8).

$$SoH(t) = SoC_{max}(t) \quad (8)$$

The charging system 400 (e.g., threshold voltage generator 418) continuously or frequently updates the relationship between the SoC and the battery voltage $V_{bat}$ and consider $V_{batref}(t)$ as a variable mapped to the $SoC_{max}(t)$ in equation (9a).

$$V_{batref}(t) \rightarrow k \cdot SoC_{max}(t) \quad (9a)$$

In equation 9(a), k is a factor that has a value (0<k<1.0) depending on the battery type. In one example, for lithium-ion batteries, k may be set within the range of 0.8 to 0.9.

Based on equation (8), $V_{batref}(t)$ can also be mapped to SoH(t), and equation (9a) can also be expressed as equation (9b).

$$V_{batref}(t) \rightarrow k \cdot \text{SoH}(t) \tag{9b}$$

Since $V_{batref}$ corresponds to the SoC, from equations (9a) and (9b), the voltage threshold value $V_{batref}(t)$ corresponds to the SoC threshold value of $\text{SoC}_{ref}$ as expressed in equation (4).

$$\text{SoC}_{ref}(t) = k \cdot \text{SoC}_{max}(t) \tag{4}$$

Automatic CC and CV Mode Change

Figure 18:
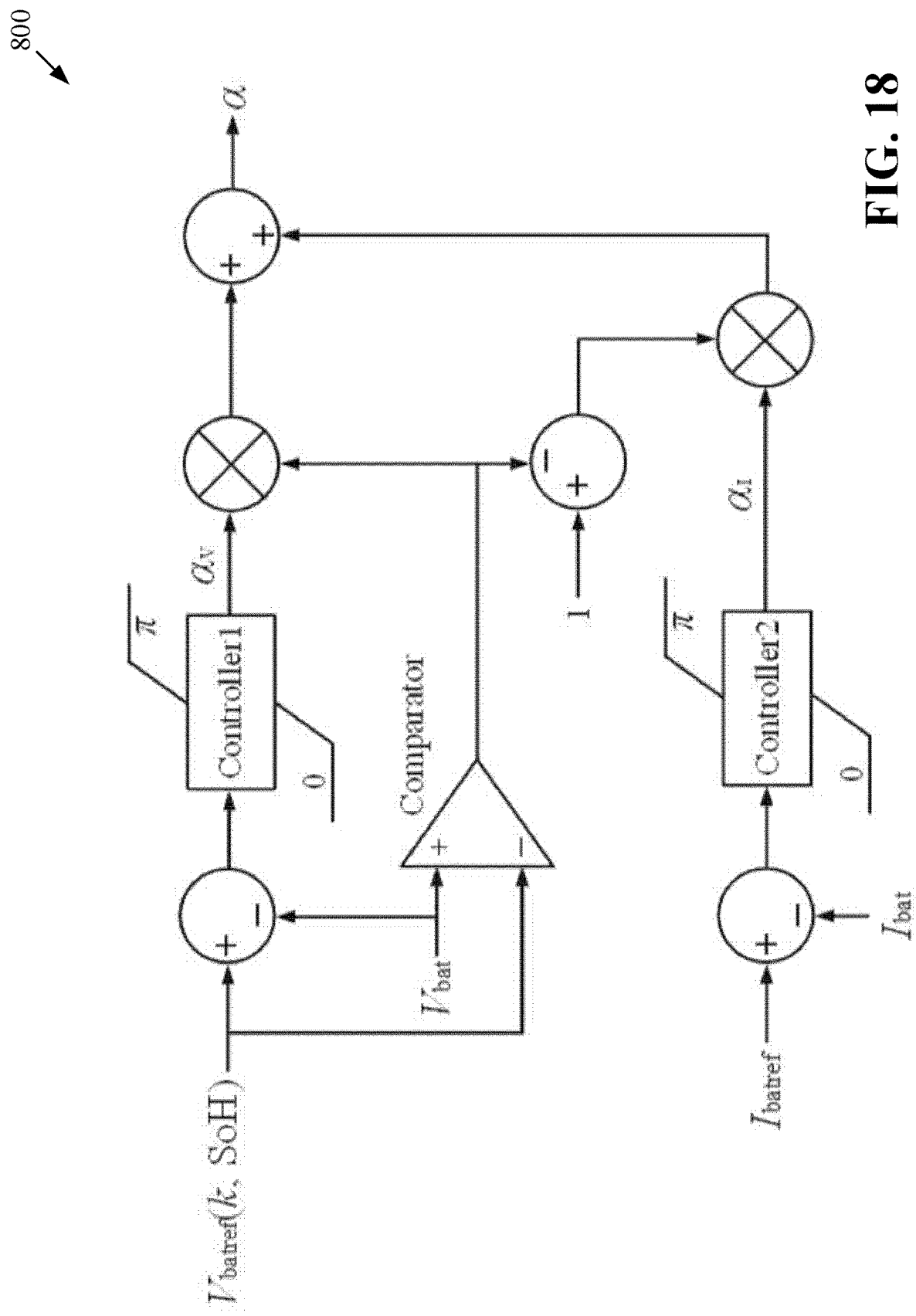
FIG. 18 is a block diagram illustrating an exemplary control block for selecting a charging mode according to some aspects of the disclosure.

The charging controller (e.g., control strategy block 420) may be configured to control the power inverter, for example, the phase-shift angle of the switching signals controlling the inverter based on the current SoH/SoC and $V_{batref}$. The wireless charging system 400 does not need to change the inverter's operating frequency as a means to change between the CC mode and CV mode. FIG. 18 is a block diagram illustrating an exemplary control block 800 for selecting the charging mode during charging. The control block 800 can be implemented in analog form, digital form, or a combination of both including hardware and/or software. In one aspect of the disclosure, the control block may be implemented by the charging controller 420.

Referring to FIG. 18, the CV mode is controlled by controller-1, which generates the phase shift angle $\alpha_v$ for the CV mode. On the contrary, the CC mode is controlled by controller-2, which provides the phase shift angle $\alpha_I$ for the CC mode. The choice of CC mode or CV mode is decided by comparing $V_{bat}$ with $V_{batref}$ (which is a function of the factor k and SoH) as indicated in equation (9b). The phase-shift angle $\alpha$ can be expressed by equation (31).

$$\alpha = \alpha_I \alpha_v \tag{31}$$

The logical output of the comparator in FIG. 18 enables either the CC or CV mode. When $V_{bat} < V_{batref}$, the output of the comparator in FIG. 18 is low (i.e., 0), through the multiplier for $\alpha_v$, any $\alpha_v$ multiplied by 0 is also zero, thus disabling the CV mode. In this case, the phase-shift angle is $\alpha = \alpha_I$, i.e., under CC mode. Controller-2 controls the charging current to follow a pre-set current level $I_{batref}$ (e.g., $I_{bat(sc)}$, $I_{prechg}$, $I_{batref}$, $I_{term-th}$ shown in FIG. 6) that depends on the instantaneous or current $V_{Vbat}$, for example, determined by the battery voltage and current estimator 414.

Still referring to FIG. 18, when $V_{bat} \geq V_{batref}$ occurs, the output of the comparator is high (i.e., 1). In that case, the output of the subtractor for the output of controller-2 becomes 0, and so the output of the second multiplier for $\alpha_I$ is also zero, disabling the CC mode. The phase-shift angle becomes $\alpha = \alpha_v$, i.e., under the CV mode. In the CV mode, Controller-1 controls the charging voltage near the preset value of $V_{batref}$ to charge the battery.

Figure 19:
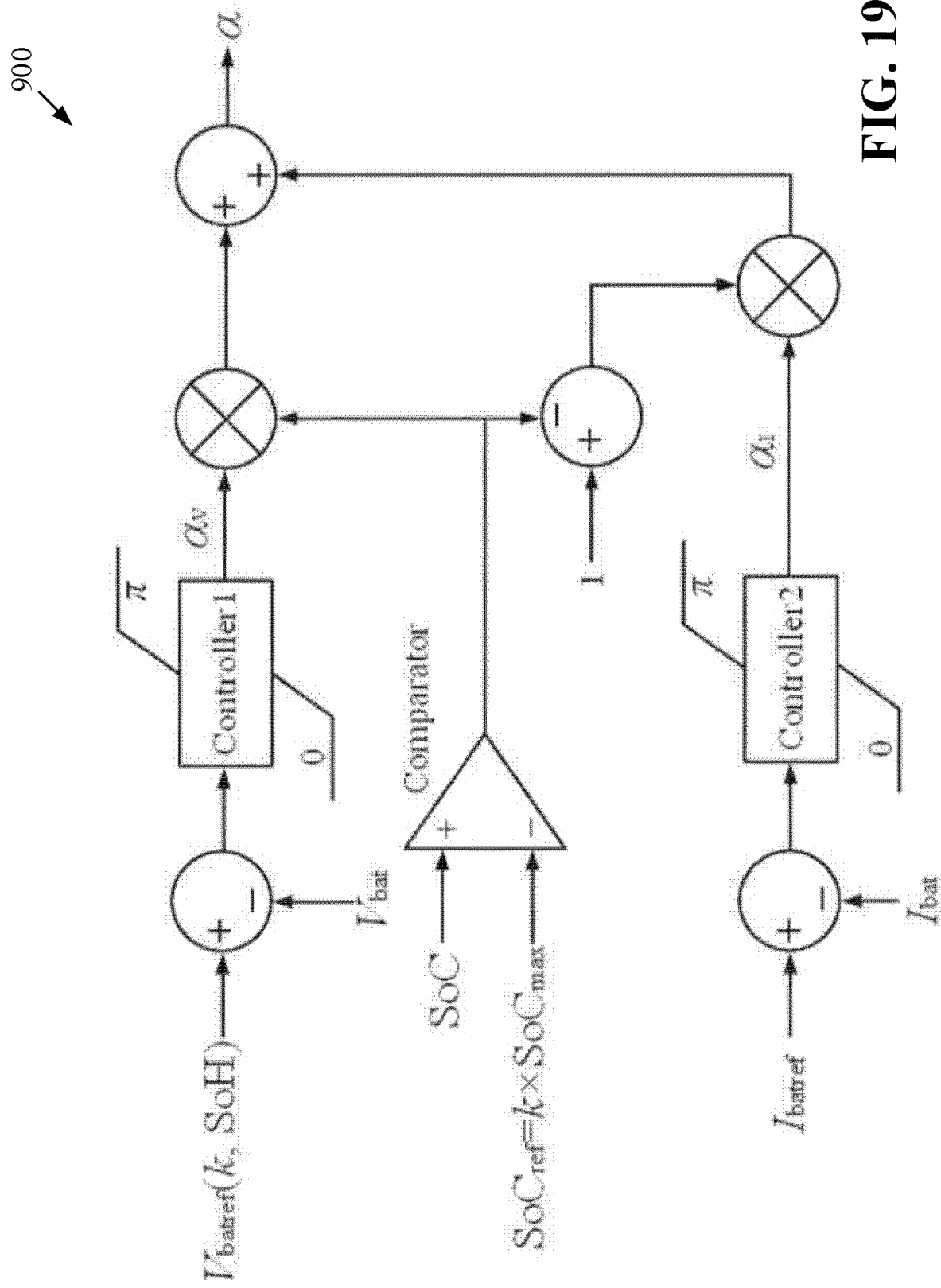
FIG. 19 is a block diagram illustrating another exemplary control block for selecting a charging mode according to some aspects of the disclosure.

FIG. 19 is a block diagram illustrating another exemplary control block 900 for selecting the charging mode (e.g., CC mode or CV mode) during charging. As described above, $V_{batref}$ is a function of k and SoH, and SoH can be defined as $\text{SoC}_{max}$. Because this example is substantially similar to the control block described in relation to FIG. 18, only the difference between them will be described for brevity. The control block of FIG. 19 uses an alternative approach for controlling charging mode change by comparing SoC (which corresponds to $V_{bat}$) and $\text{SoC}_{ref}$ (see equation (4)).

While FIG. 17 illustrates an exemplary series-series (SS) compensated wireless power transfer (WPT) system in which both the transmitter and receiver circuits are series compensated, aspects of the present invention can also apply to an XS compensated WPT system, where X refers to P (parallel), S (series), LCL (inductive-capacitive-inductive), or LCC (inductive-capacitive-capacitive) type compensated transmitter circuits. That is, the aspects of the present invention can be applied to a wide range of compensated transmitter circuits as long as the receiver circuit is series compensated.

Figure 20:
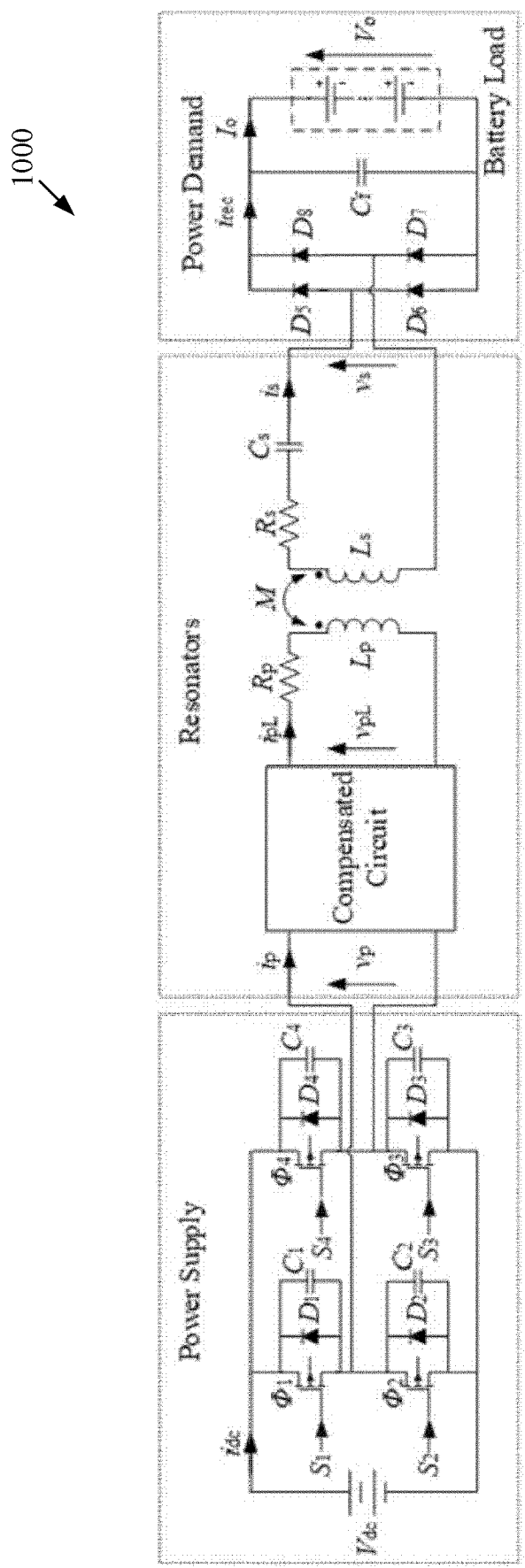
FIG. 20 is a diagram illustrating a compensated wireless power transfer (WPT) system according to some aspects of the disclosure.
Figure 21:
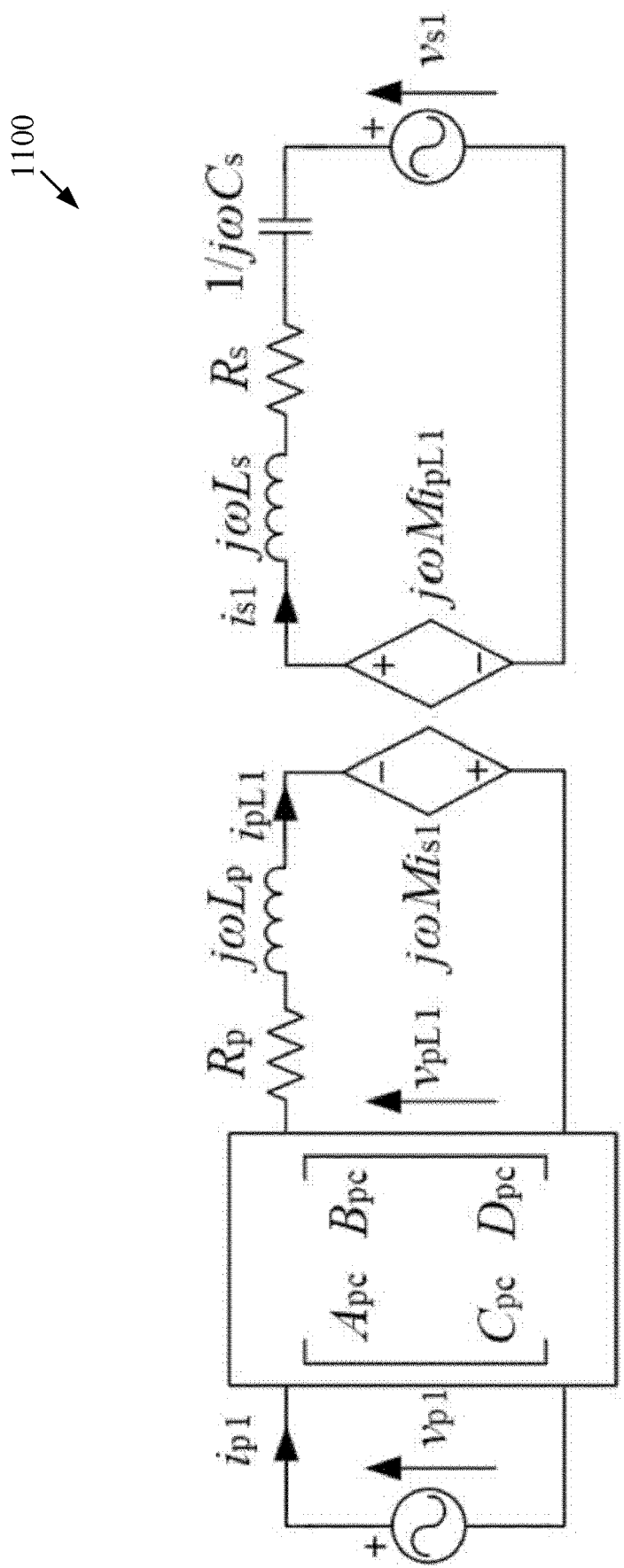
FIG. 21 is a diagram illustrating a simplified equivalent circuit of the WPT system of FIG. 20 according to some aspects of the disclosure.

FIG. 20 is a diagram illustrating an XS compensated WPT system 1000 according to some aspects of the disclosure. In the WPT system 1000, the transmitter circuit can be series, LCL, or LCC type compensated. FIG. 21 is a diagram of a simplified equivalent circuit 1100 of the WPT system 1000. The equivalent circuit of the resonators is depicted in FIG. 21. Here, $\omega$ is the switching angular frequency. $v_{p1}$, $i_{p1}$, $v_{pL1}$, $i_{pL1}$, $i_{s1}$ and $v_{s1}$ are the fundamental components of $v_p$, $i_p$, $v_{pL}$, $i_{pL}$, $i_s$ and $v_s$. Based on known circuit theories, these variables can be expressed in the following equations.

$$\begin{bmatrix} v_{p1} \\ i_{p1} \end{bmatrix} = \begin{bmatrix} A_{pc} & B_{pc} \\ C_{pc} & D_{pc} \end{bmatrix} \begin{bmatrix} v_{pL1} \\ i_{pL1} \end{bmatrix} \tag{31.1}$$

$$v_{pL1} + j\omega M i_{s1} = (j\omega L_p + R_p) i_{pL1} \tag{31.2}$$

$$j\omega M i_{pL1} = Z_s i_{s1} + v_{s1} \tag{31.3}$$

where $Z_s = j\omega L_s + \dfrac{1}{j\omega C_s} + R_s$ $$A_{pc} = \left. \dfrac{v_{p1}}{v_{pL1}} \right|_{i_{pL1}=0}$$

$$B_{pc} = \left. \dfrac{v_{p1}}{i_{pL1}} \right|_{v_{pL1}=0}$$

$$C_{pc} = \left. \dfrac{i_{p1}}{v_{pL1}} \right|_{i_{pL1}=0}$$

$$D_{pc} = \left. \dfrac{i_{p1}}{i_{pL1}} \right|_{v_{pL1}=0}$$

The specific transmission parameters (i.e., $A_{pc}$, $B_{pc}$, $C_{pc}$, and $D_{pc}$) for different types of compensation are provided in Table I below.

TABLE I

Transmission Parameters of Different Compensations of the Primary Circuit

| Type | Circuit diagram | Transmission parameters | | | |
|------|-----------------|-----|-----|-----|-----|
|      |                 | $A_{pc}$ | $B_{pc}$ | $C_{pc}$ | $D_{pc}$ |
| Series |  | 1 | $\dfrac{1}{j\omega C_p}$ | 0 | 1 |

TABLE I-continued

Transmission Parameters of Different Compensations of the Primary Circuit

| Type | Circuit diagram | Transmission parameters | | | |
|---|---|---|---|---|---|
| | | $A_{pc}$ | $B_{pc}$ | $C_{pc}$ | $D_{pc}$ |
| Parallel |  | 1 | 0 | $j\omega C_p$ | 1 |
| LCL |  | 1 | $j\omega L_{p1}$ | $j\omega C_p$ | 1 |
| LCC | 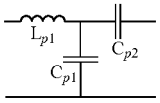 | $1 - \omega^2 L_{p1} C_{p1}$ | $\dfrac{1 - \omega^2 L_{p1}(C_{p1} + C_{p2})}{j\omega C_{p2}}$ | $j\omega C_{p1}$ | $1 + \dfrac{C_{p1}}{C_{p2}}$ |

Based on equations (31.2) and (31.3), the fundamental components of the output voltage and current of the receiver circuit can be estimated using $v_{pL1}$ and $i_{pL1}$, $$\begin{bmatrix} \tilde{v}_{s1} \\ \tilde{i}_{s1} \end{bmatrix} = \begin{bmatrix} \dfrac{Z_s}{j\omega M} & -\dfrac{\omega^2 M^2 + (j\omega L_p + R_p) Z_s}{j\omega M} \\ -\dfrac{1}{j\omega M} & \dfrac{j\omega L_p + R_p}{j\omega M} \end{bmatrix} \begin{bmatrix} v_{pL1} \\ i_{pL1} \end{bmatrix} \quad (32.1)$$

By substituting (31.1) into (32.1), the fundamental components of the output voltage and current of the receiver can be estimated based on vp1 and ip1 in equation (32.2), $$\begin{bmatrix} \tilde{v}_{s1} \\ \tilde{i}_{s1} \end{bmatrix} = \dfrac{1}{A_{pc} D_{pc} - B_{pc} C_{pc}} \begin{bmatrix} A'_{pc} & B'_{pc} \\ C'_{pc} & D'_{pc} \end{bmatrix} \begin{bmatrix} v_{p1} \\ i_{p1} \end{bmatrix} \quad (32.2)$$

$$A'_{pc} = \dfrac{Z_s}{j\omega M} D_{pc} + \dfrac{\omega^2 M^2 + (j\omega L_p + R_p) Z_s}{j\omega M} C_{pc}$$

$$B'_{pc} = -\dfrac{Z_s}{j\omega M} B_{pc} - \dfrac{\omega^2 M^2 + (j\omega L_p + R_p) Z_s}{j\omega M} A_{pc}$$

$$C'_{pc} = -\dfrac{1}{j\omega M} D_{pc} - \dfrac{j\omega L_p + R_p}{j\omega M} C_{pc}$$

$$D'_{pc} = \dfrac{1}{j\omega M} B_{pc} + \dfrac{j\omega L_p + R_p}{j\omega M} A_{pc}$$

Based on equation (32.2), the amplitudes of $\tilde{v}_{s1}$ and $\tilde{i}_{s1}$ can be estimated by $$|\tilde{v}_{s1}| = \left| \dfrac{A'_{pc}}{A_{pc} D_{pc} - B_{pc} C_{pc}} v_{p1} + \dfrac{B'_{pc}}{A_{pc} D_{pc} - B_{pc} C_{pc}} i_{p1} \right| \quad (33.1)$$

$$|\tilde{i}_{s1}| = \left| \dfrac{C'_{pc}}{A_{pc} D_{pc} - B_{pc} C_{pc}} v_{p1} + \dfrac{D'_{pc}}{A_{pc} D_{pc} - B_{pc} C_{pc}} i_{p1} \right| \quad (33.2)$$

Where the operator |·| signifies the amplitudes of AC signals.

Besides, the inputs and outputs of the diode-bridge rectifier and the filter capacitor satisfy equations (40.1) and (40.2).

$$|v_{s1}| = \dfrac{4(V_o + 2V_D)}{\pi} \quad (40.1)$$

$$|i_{s1}| = \dfrac{\pi I_o}{2} \quad (40.2)$$

where $V_D$ is the forward voltage of the diodes (i.e., diodes D5 to D8 in FIG. 20).

By substituting equations (33.1) and (33.2) into equations (40.1) and (40.2), respectively, the output voltage and current can be estimated at the primary side using equations (50.1) and (50.2).

$$\tilde{V}_o = \dfrac{\pi}{4} \left| \dfrac{A'_{pc}}{A_{pc} D_{pc} - B_{pc} C_{pc}} v_{p1} + \dfrac{B'_{pc}}{A_{pc} D_{pc} - B_{pc} C_{pc}} i_{p1} \right| - 2V_D \quad (50.1)$$

$$\tilde{I}_o = \dfrac{2}{\pi} \left| \dfrac{C'_{pc}}{A_{pc} D_{pc} - B_{pc} C_{pc}} v_{p1} + \dfrac{D'_{pc}}{A_{pc} D_{pc} - B_{pc} C_{pc}} i_{p1} \right| \quad (50.2)$$

In some aspects of the disclosure, the compensated capacitor $C_s$ can nullify the self-inductance of the receiver coil to increase (e.g., maximize) the power transfer capability of the circuit as expressed in equation (60).

$$C_s = \dfrac{1}{\omega_o^2 L_s} \quad (60)$$

where $\omega_o$ is the operating angular frequency.

In addition, for the coils with high quality factors, the following terms can be approximated as zero in the following equations.

$$\dfrac{R_p}{\omega_o L_p} \cdot \dfrac{L_p}{M} \approx 0, \; \dfrac{R_s}{\omega_o L_s} \cdot \dfrac{L_s}{M} \approx 0 \quad (70)$$

By substituting equations (60) and (70) into equations (50.1) and (50.2), the output voltage and current of the primary side can be estimated using equations (80.1) and (80.2) below.

$$\tilde{V}_o = \frac{\pi\omega_o M |C_{pc}v_{p1} - A_{pc}i_{p1}|}{4(A_{pc}D_{pc} - B_{pc}C_{pc})} - 2V_D \quad (80.1)$$

$$\tilde{I}_o = \frac{2|(D_{pc} + j\omega_o L_p C_{pc})v_{p1} - (B_{pc} + j\omega_o L_p A_{pc})i_{p1}|}{\pi\omega_o M(A_{pc}D_{pc} - B_{pc}C_{pc})} \quad (80.2)$$

Based on equations (80.1) and (80.2) and the transmission parameters in Table I, the specific estimation equations for the charging voltage and current can be determined using Table II below.

TABLE II

Estimation Equations for Different Compensations

| Type | Voltage ($\tilde{V}_o$) | Current ($\tilde{I}_o$) |
|---|---|---|
| Series | $\dfrac{\pi\omega_o M |i_{p1}|}{4} - 2V_D$ | $\dfrac{2\left|v_{p1} - \left(j\omega_o L_p + \dfrac{1}{j\omega_o C_p}\right)i_{p1}\right|}{\pi\omega_o M}$ |
| Parallel | $\dfrac{\pi\omega_o M |j\omega_o C_p v_{p1} - i_{p1}|}{4} - 2V_D$ | $\dfrac{2|(1 - \omega_o^2 L_p C_p)v_{p1} - j\omega_o L_p i_{p1}|}{\pi\omega_o M}$ |
| LCL | $\dfrac{\pi\omega_o M |j\omega_o C_p v_{p1} - i_{p1}|}{4(1 + \omega_o^2 L_{p1} C_p)} - 2V_D$ | $\dfrac{2|(1 - \omega_o^2 L_p C_p)v_{p1} - j\omega_o(L_p + L_{p1})i_{p1}|}{\pi\omega_o M(1 + \omega_o^2 L_{p1} L_p)}$ |
| LCC | $\dfrac{\pi\omega_o M |Ev_{p1} - Fi_{p1}|}{4} - 2V_D$ | $\dfrac{2|Gv_{p1} - Hi_{p1}|}{\pi\omega_o M}$ |

The values of E and H in Table II can be determined as follows:

$$E = j\omega_o C_{p1}, \quad F = 1 - \omega_o^2 L_{p1} C_{p1}, \quad G = 1 + \frac{C_{p1}}{C_{p2}} - \omega_o^2 L_p C_{p1}$$

$$H = \frac{1 - \omega_o^2(L_{p1}C_{p1} + L_{p1}C_{p2} + L_p C_{p2}) + \omega_o^4 L_p L_{p1} C_{p1} C_{p2}}{j\omega_o C_{p2}}.$$

Figure 22:
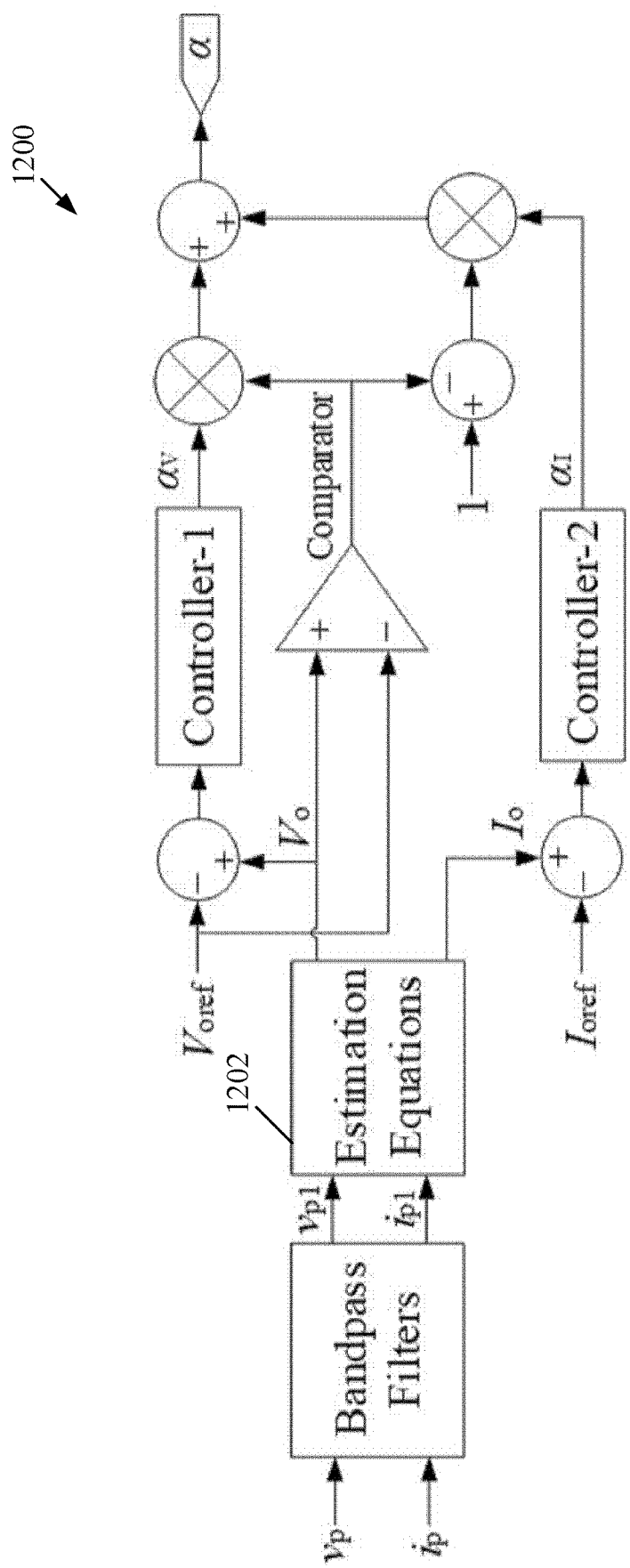
FIG. 22 is a block diagram illustrating a generalized control scheme of the WPT system of FIG. 20 according to some aspects of the disclosure.

FIG. 22 is a block diagram 1200 illustrating a generalized control scheme of the WPT system 1000 according to some aspects of the disclosure. In this generalized control scheme, the estimation equations 1202 may depend on the type of compensation (e.g., XS compensated circuits as described above in relation to FIGS. 20-21) used in the transmitter circuit as tabulated in Table II.

A first embodiment of a battery charging system for charging a battery includes a charging circuit configured to charge the battery, and a controller communicatively coupled with the charging circuit. The controller determines a current or present condition of the battery. The controller dynamically determines a threshold voltage for controlling a charging mode of the charging circuit, based on the current condition. The controller determines a battery voltage of the battery during charging. The controller configures the charging circuit to charge the battery using a constant current (CC) mode when the battery voltage is less than the threshold voltage, and configures the charging circuit to charge the battery using a constant voltage (CV) mode when the battery voltage is equal to or greater than the threshold voltage.

A second embodiment in combination with the first embodiment, wherein the current condition comprises a current state-of-health (SoH) or a maximum state-of-charge (SoC$_{max}$) of the battery. A third embodiment in combination with the second embodiment, wherein the controller is further configured to determine the threshold voltage based on SoH or SoC$_{max}$.

A fourth embodiment in combination with the first embodiment, wherein the charging circuit comprises a transmitter-side portion configured to transmit power wirelessly, and a receiver-side portion configured to wirelessly receive power from the transmitter-side portion and charge the battery without providing control feedback to the transmitter-side portion.

A fifth embodiment in combination with any of the first to fourth embodiments, wherein the receiver-side portion comprises a series compensated circuit; and the transmitter-side portion comprises a series compensated circuit, a parallel compensated circuit, an inductive-capacitive-capacitive (LCC) compensated circuit, or an inductive-capacitive-inductive (LCL) compensated circuit.

A sixth embodiment in combination with any of the first to fifth embodiments, wherein the receiver-side portion comprises a rectifier that is configured to charge the battery without using a charging management circuit between the rectifier and the battery.

A seventh embodiment in combination with any of the first to sixth embodiments, wherein the transmitter-side portion comprises a coil resonator and at least one sensor configured to monitor a primary voltage and a primary current of the coil resonator. The controller is further configured to estimate a voltage and a current of the battery based on the primary voltage and the primary current, and determine the condition of the battery based on the estimated voltage and the estimated current of the battery.

An eighth embodiment in combination with any of the first to seventh embodiments, wherein the controller is further configured to determine the voltage and the current of the battery without receiving information on the battery from the receiver-side portion.

A ninth embodiment in combination with any of the first to eighth embodiments, wherein the transmitter-side portion comprises a power inverter that is controlled by a plurality of switching signals, and the controller is further configured to control a phase-shift angle of the plurality of switching signals to control the primary current and the primary voltage.

A tenth embodiment in combination with any of the first to ninth embodiments, wherein the power inverter is configured to operate at a same switching frequency when charging the battery in the CC mode and the CV mode according to the phase-shift angle of the plurality of switching signals.

An eleventh embodiment in combination with any of the first to tenth embodiments, wherein the switching frequency is substantially equal to a resonant frequency of the coil resonator.

A twelfth embodiment in combination with any of the first to eleventh embodiments, wherein a resonant frequency of the coil resonator of the transmitter-side portion is substantially equal to a resonant frequency of a coil resonator of the receiver-side portion.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-22 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more."

Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A battery charging system for charging a battery, comprising:
    a charging circuit configured to charge the battery; and
    a controller communicatively coupled with the charging circuit,
    wherein the controller is configured to:
    determine a current condition of the battery, wherein the current condition comprises a current state-of-health (SoH) or a maximum state-of-charge (SoCmax) of the battery;
    dynamically determine a threshold voltage for controlling a charging mode of the charging circuit, based on the current condition;
    determine a battery voltage of the battery during charging;
    configure the charging circuit to charge the battery using a constant current (CC) mode when the battery voltage is less than the threshold voltage; and
    configure the charging circuit to charge the battery using a constant voltage (CV) mode when the battery voltage is equal to or greater than the threshold voltage.

2. The battery charging system of claim 1, wherein the controller is further configured to determine the threshold voltage based on SoH or SoCmax.

3. The battery charging system of claim 1, wherein the charging circuit comprises:
    a transmitter-side portion configured to transmit power wirelessly; and
    a receiver-side portion configured to wirelessly receive power from the transmitter-side portion and charge the battery without providing control feedback to the transmitter-side portion.

4. The battery charging system of claim 3, wherein:
    the transmitter-side portion comprises a series compensated circuit; and
    the receiver-side portion comprises a series compensated circuit.

5. The battery charging system of claim 3, wherein:
    the receiver-side portion comprises a series compensated circuit; and
    the transmitter-side portion comprises a parallel compensated circuit.

6. The battery charging system of claim 3, wherein:
    the receiver-side portion comprises a series compensated circuit; and
    the transmitter-side portion comprises an inductive-capacitive-capacitive (LCC) compensated circuit.

7. The battery charging system of claim 3, wherein:
    the receiver-side portion comprises a series compensated circuit; and
    the transmitter-side portion comprises an inductive-capacitive-inductive (LCL) compensated circuit.

8. The battery charging system of claim 3, wherein the receiver-side portion comprises a rectifier that is configured to charge the battery without using a charging management circuit between the rectifier and the battery.

9. The battery charging system of claim 3,
wherein the transmitter-side portion comprises a coil resonator and at least one sensor configured to monitor a primary voltage and a primary current of the coil resonator; and
wherein the controller is further configured to:
estimate a voltage and a current of the battery based on the primary voltage and the primary current; and
determine the condition of the battery based on the estimated voltage and the estimated current of the battery.

10. The battery charging system of claim 9, wherein the controller is further configured to determine the voltage and the current of the battery without receiving information on the battery from the receiver-side portion.

11. The battery charging system of claim 9,
wherein the transmitter-side portion comprises a power inverter that is controlled by a plurality of switching signals, and
wherein the controller is further configured to control a phase-shift angle of the plurality of switching signals to control the primary current and the primary voltage.

12. The battery charging system of claim 11, wherein the power inverter is configured to operate at a same switching frequency when charging the battery in the CC mode and the CV mode according to the phase-shift angle of the plurality of switching signals.

13. The battery charging system of claim 12, wherein the switching frequency is substantially equal to a resonant frequency of the coil resonator.

14. The battery charging system of claim 11, wherein a resonant frequency of the coil resonator of the transmitter-side portion is substantially equal to a resonant frequency of a coil resonator of the receiver-side portion.

15. A battery charging method comprising:
determining a current condition of a battery, wherein the current condition comprises a current state-of-health (SoH) or a maximum state-of-charge (SoCmax) of the battery;
dynamically determining a threshold voltage for controlling a charging mode of the battery based on the current condition;
determining a battery voltage of the battery during charging;
charging the battery using a constant current (CC) mode when the battery voltage is less than the threshold voltage; and
charging the battery using a constant voltage (CV) mode when the battery voltage is equal to or greater than the threshold voltage.

16. The method of claim 15, wherein the dynamically determining the threshold voltage comprises determining the threshold voltage based on SoH or SoCmax.

17. The method of claim 15, further comprising:
transmitting power wirelessly at a transmitter-side portion of a charger; and
receiving the power wirelessly at a receiver-side portion of the charger that is configured to charge the battery without providing control feedback to the transmitter-side portion.

18. The method of claim 17, wherein:
transmitting the power using a series compensated circuit included in the transmitter-side portion; and
receiving the power using a series compensated circuit included in the receiver-side portion.

19. The method of claim 17, wherein:
transmitting the power using a parallel compensated circuit included in the transmitter-side portion; and
receiving the power using a series compensated circuit included in the receiver-side portion.

20. The method of claim 17, wherein:
transmitting the power using an inductive-capacitive-capacitive (LCC) compensated circuit included in the transmitter-side portion; and
receiving the power using a series compensated circuit included in the receiver-side portion.

21. The method of claim 17, wherein:
transmitting the power using an inductive-capacitive-inductive (LCL) compensated circuit included in the transmitter-side portion; and
receiving the power using a series compensated circuit included in the receiver-side portion.

22. The method of claim 17, further comprising charging the battery without using a charging management circuit between a rectifier of the receiver-side portion and the battery.

23. The method of claim 17, further comprising:
monitoring a primary voltage and a primary current of a coil resonator of the transmitter-side portion;
estimating a voltage and a current of the battery based on the primary voltage and the primary current; and
determining the condition of the battery based on the estimated voltage and the estimated current of the battery.

24. The method of claim 23, further comprising:
determining the voltage and the current of the battery without receiving information on the battery from the receiver-side portion.

25. The method of claim 23, further comprising:
controlling a power inverter of the transmitter-side portion using a plurality of switching signals, and
controlling a phase-shift angle of the plurality of switching signals to control the primary current and the primary voltage.

26. The method of claim 25, further comprising:
operating the power inverter at a same switching frequency when charging the battery in the CC mode and the CV mode according to the phase-shift angle of the plurality of switching signals.

27. The method of claim 26, wherein the switching frequency is substantially equal to a resonant frequency of the coil resonator.

* * * * *